United States Patent
Crozzoli

(10) Patent No.: US 12,163,579 B2
(45) Date of Patent: Dec. 10, 2024

(54) DIFFERENTIAL WITH BALLS OR ROLLERS ON CONVERGENT ELLIPTICAL TRACKS

(71) Applicant: Gualtiero Crozzoli, Rome (IT)

(72) Inventor: Gualtiero Crozzoli, Rome (IT)

( * ) Notice: Subject to any disclaimer, the term of this patent is extended or adjusted under 35 U.S.C. 154(b) by 0 days.

(21) Appl. No.: 17/789,773

(22) PCT Filed: Jun. 25, 2021

(86) PCT No.: PCT/IT2021/050199
§ 371 (c)(1),
(2) Date: Jun. 28, 2022

(87) PCT Pub. No.: WO2022/009241
PCT Pub. Date: Jan. 13, 2022

(65) Prior Publication Data
US 2023/0044260 A1 Feb. 9, 2023

(30) Foreign Application Priority Data
Jul. 10, 2020 (IT) .................. 102020000015964

(51) Int. Cl.
*F16H 48/14* (2006.01)
*F16H 48/38* (2012.01)

(52) U.S. Cl.
CPC .............. *F16H 48/14* (2013.01); *F16H 48/38* (2013.01)

(58) Field of Classification Search
CPC .......... F16H 48/14; F16H 48/38; F16H 25/06; F16H 2025/063; F16H 48/147
(Continued)

(56) References Cited

U.S. PATENT DOCUMENTS

| | | | | |
|---|---|---|---|---|
| 4,586,395 A | * | 5/1986 | Fukuchi | F16H 57/0483 184/6.12 |
| 5,865,071 A | * | 2/1999 | Mimura | F16H 48/147 74/650 |
| 6,487,930 B1 | * | 12/2002 | Yamada | F16H 25/06 74/567 |

FOREIGN PATENT DOCUMENTS

| | | |
|---|---|---|
| DE | 736494 C | 6/1943 |
| FR | 2723161 A1 | 2/1996 |

(Continued)

OTHER PUBLICATIONS

International Search Report and Written Opinion dated Oct. 14, 2021 from counterpart International Patent Appllication No. PCT/IT2021/050199.

*Primary Examiner* — Victor L MacArthur
(74) *Attorney, Agent, or Firm* — SHUTTLEWORTH & INGERSOLL, P.L.C.; Timothy J. Klima

(57) ABSTRACT

A differential made without gears in the satellites and planetaries, in the planetary shafts elliptical tracks are obtained on the fronts and on the circumferences of the shafts, the shape of the tracks is semi-spherical or semi-cylindrical and requires the profile of half spheres or half rollers to roll tangentially within the tracks for a part of their circumference, the balls or rollers being constrained partly in the tracks, partly in the translators and, sometimes, partly in the cylinder and otherwise in the cross that divides the two shafts. The whole is contained by the cylinder in which the longitudinal seats are dedicated to the translators and the spheres that drag the balls or rollers. This cylinder can also be composed of two parts joined at the center to block the cross. In some cases, inside the shafts a bilateral locking and unlocking solenoid (SBL) is installed.

11 Claims, 20 Drawing Sheets

(58) Field of Classification Search
USPC .......................................................... 74/650
See application file for complete search history.

(56)             References Cited

FOREIGN PATENT DOCUMENTS

JP       H09184562 A    7/1997
SU         1507603 A1   9/1989

* cited by examiner

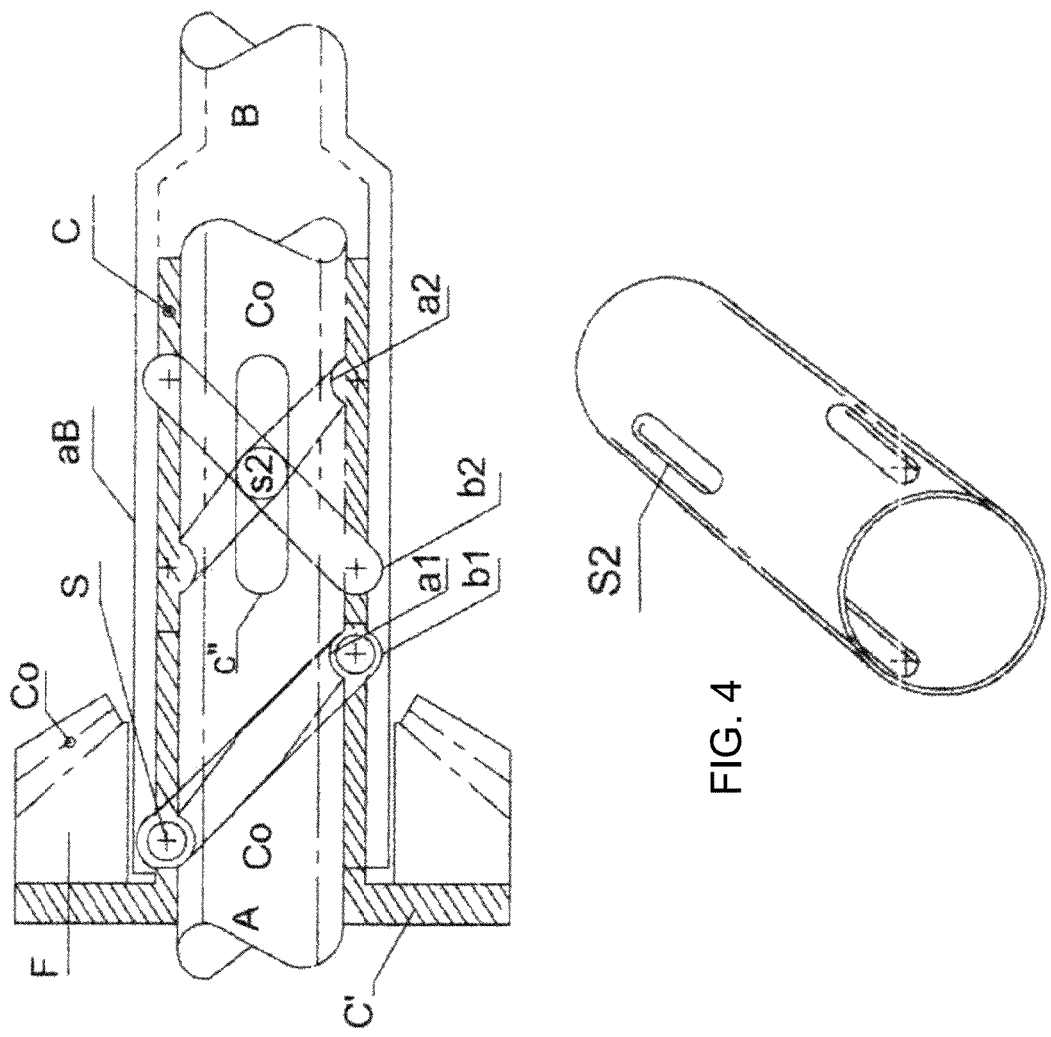
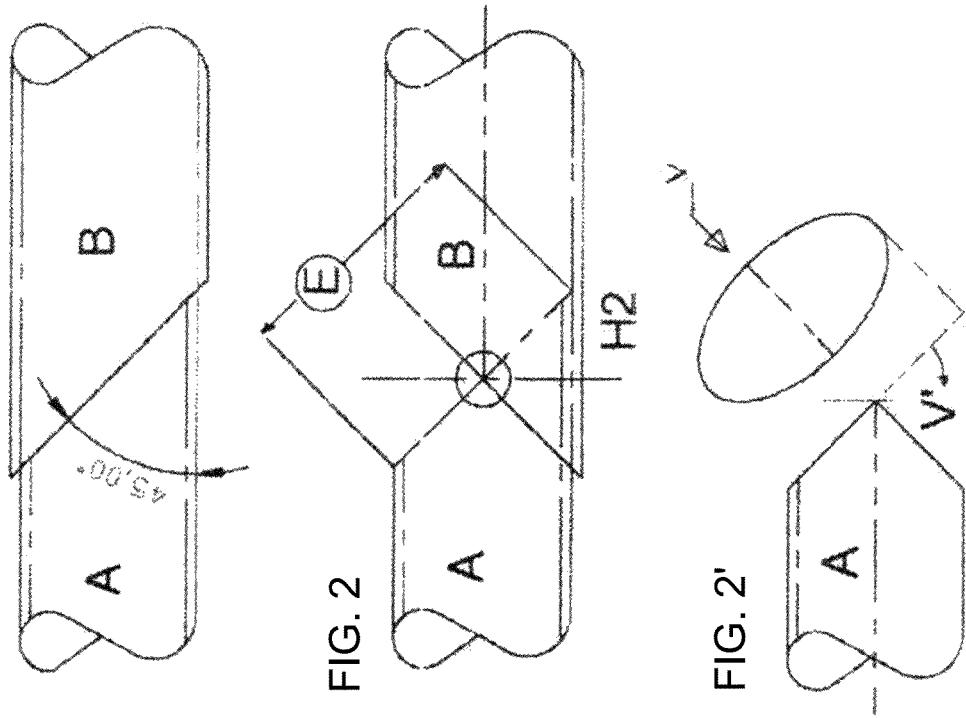

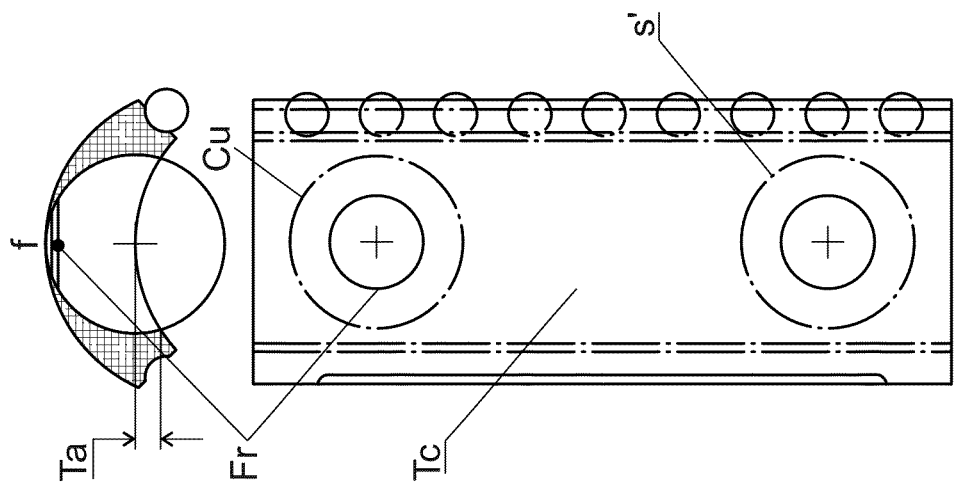
FIG. 11T
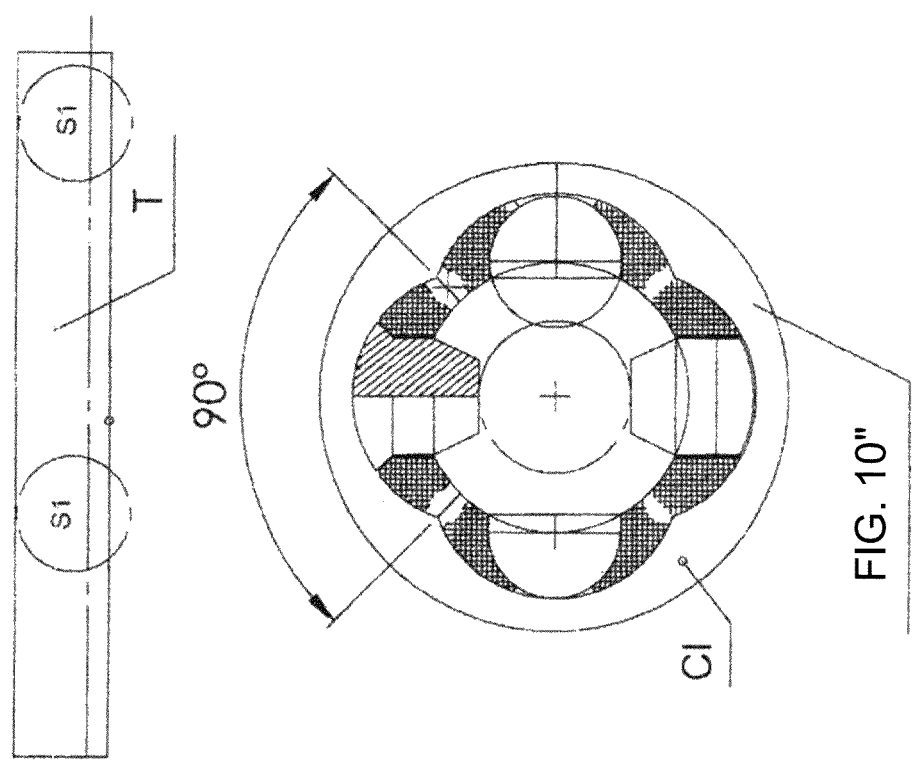
FIG. 10"

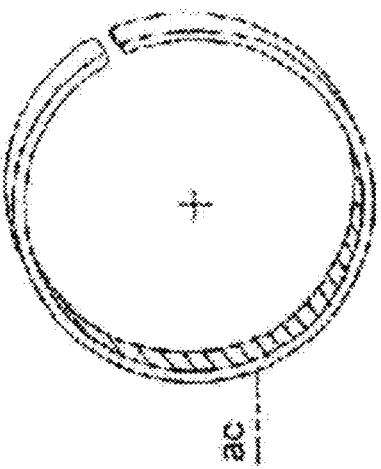
FIG. 31
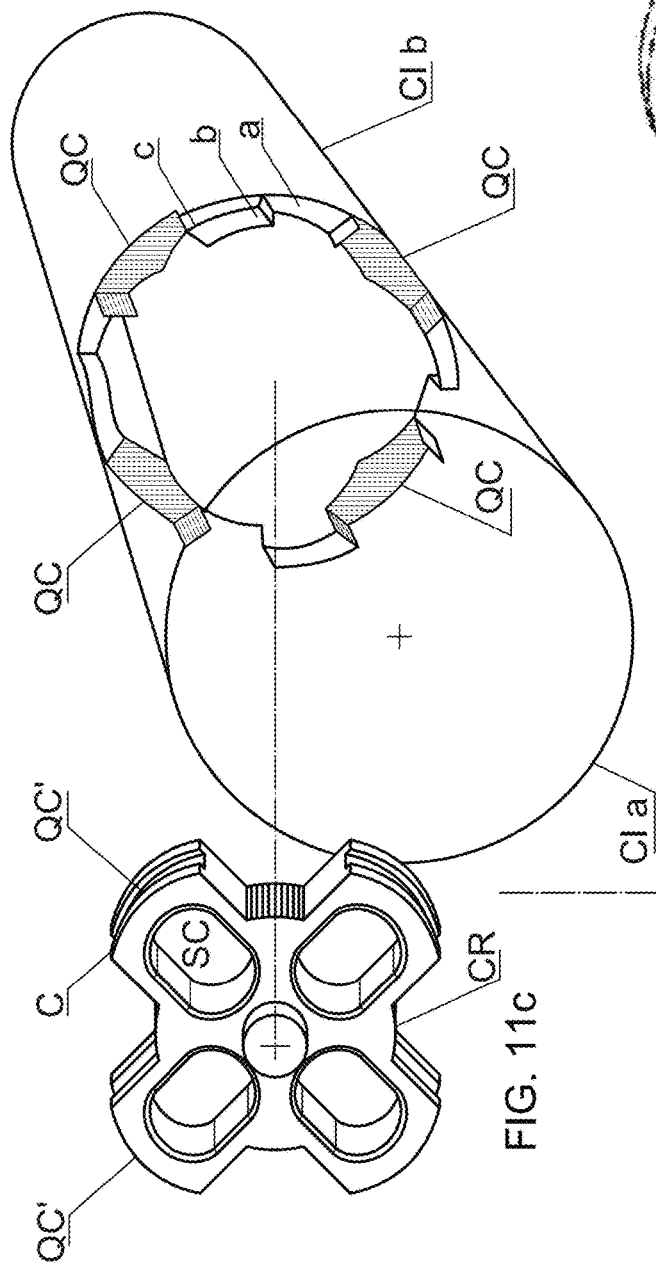
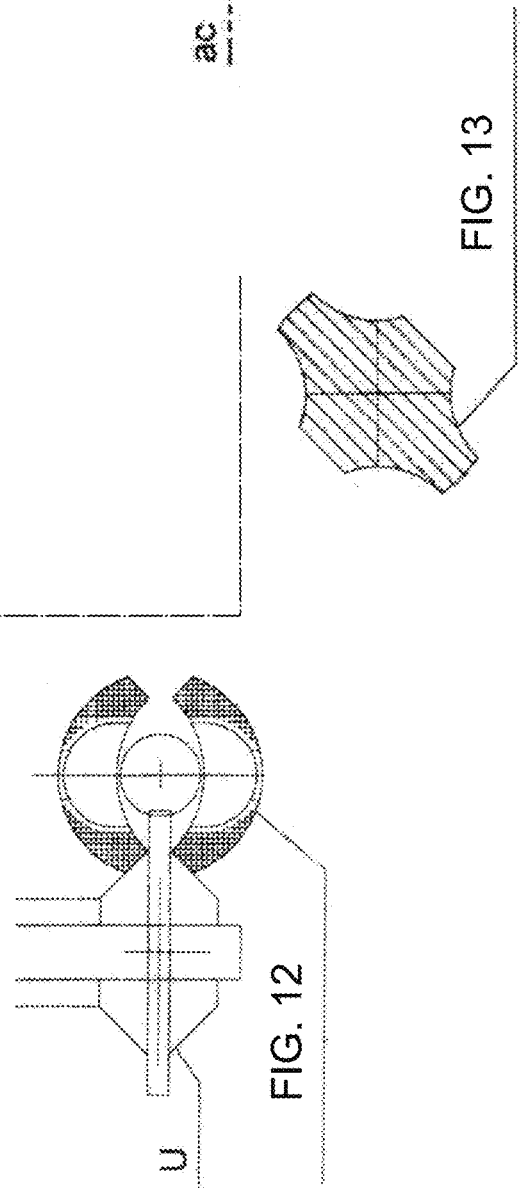
FIG. 13
FIG. 11c
FIG. 12

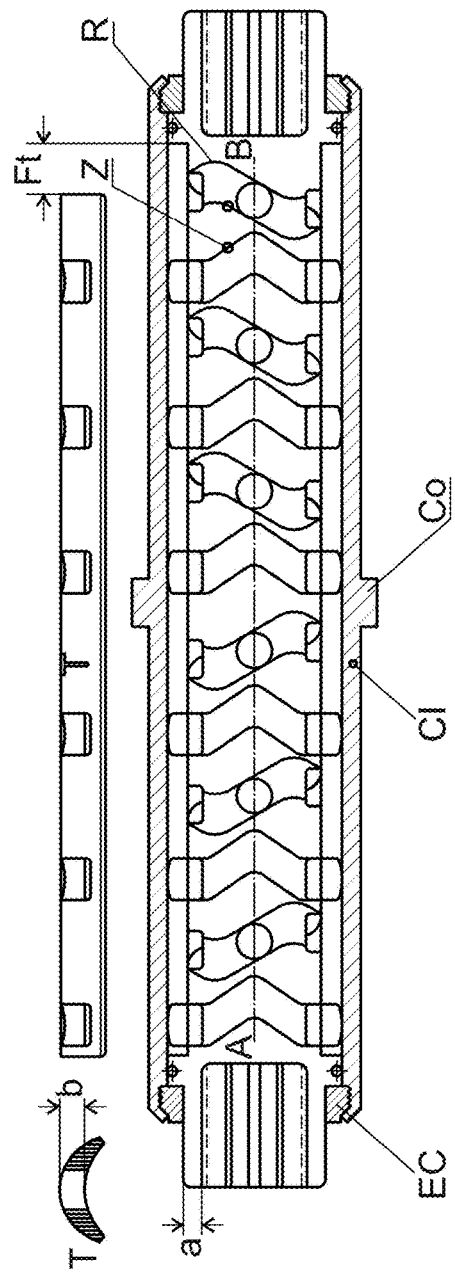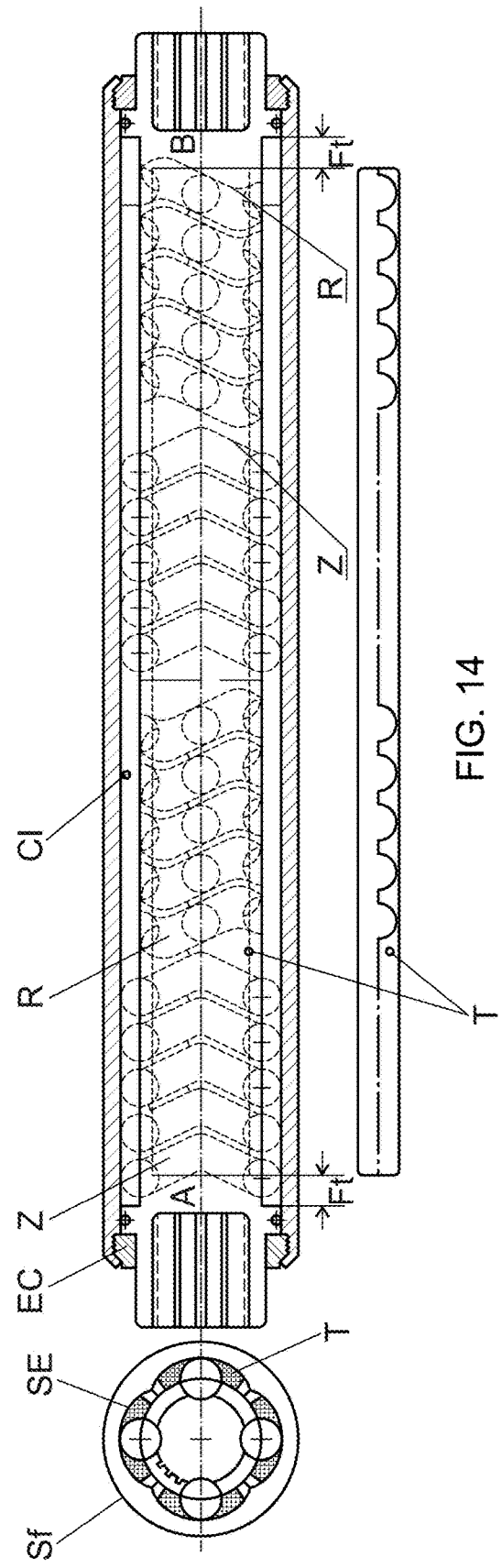

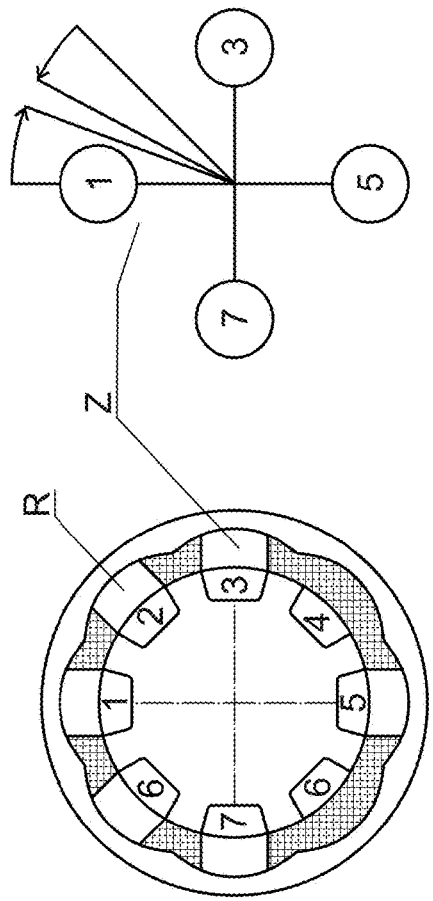
FIG. 16
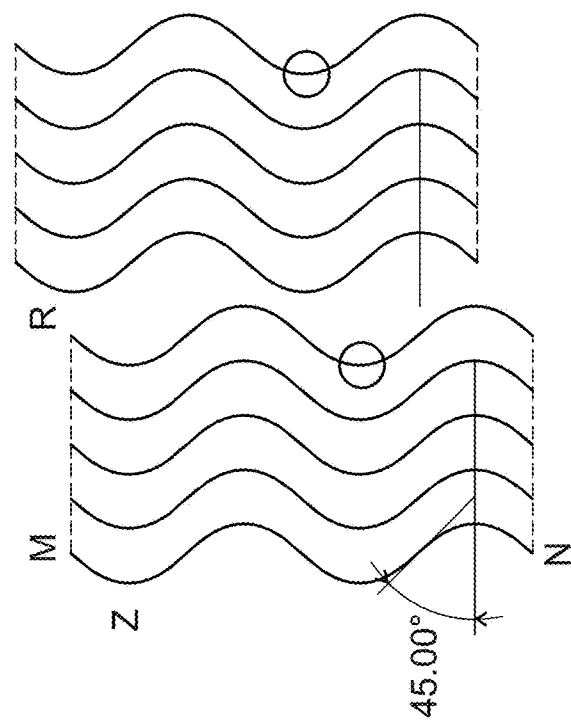
FIG. 15f
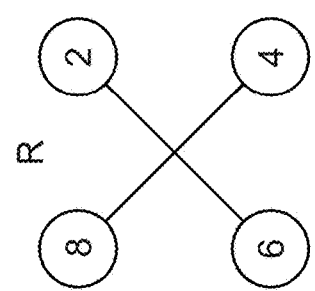

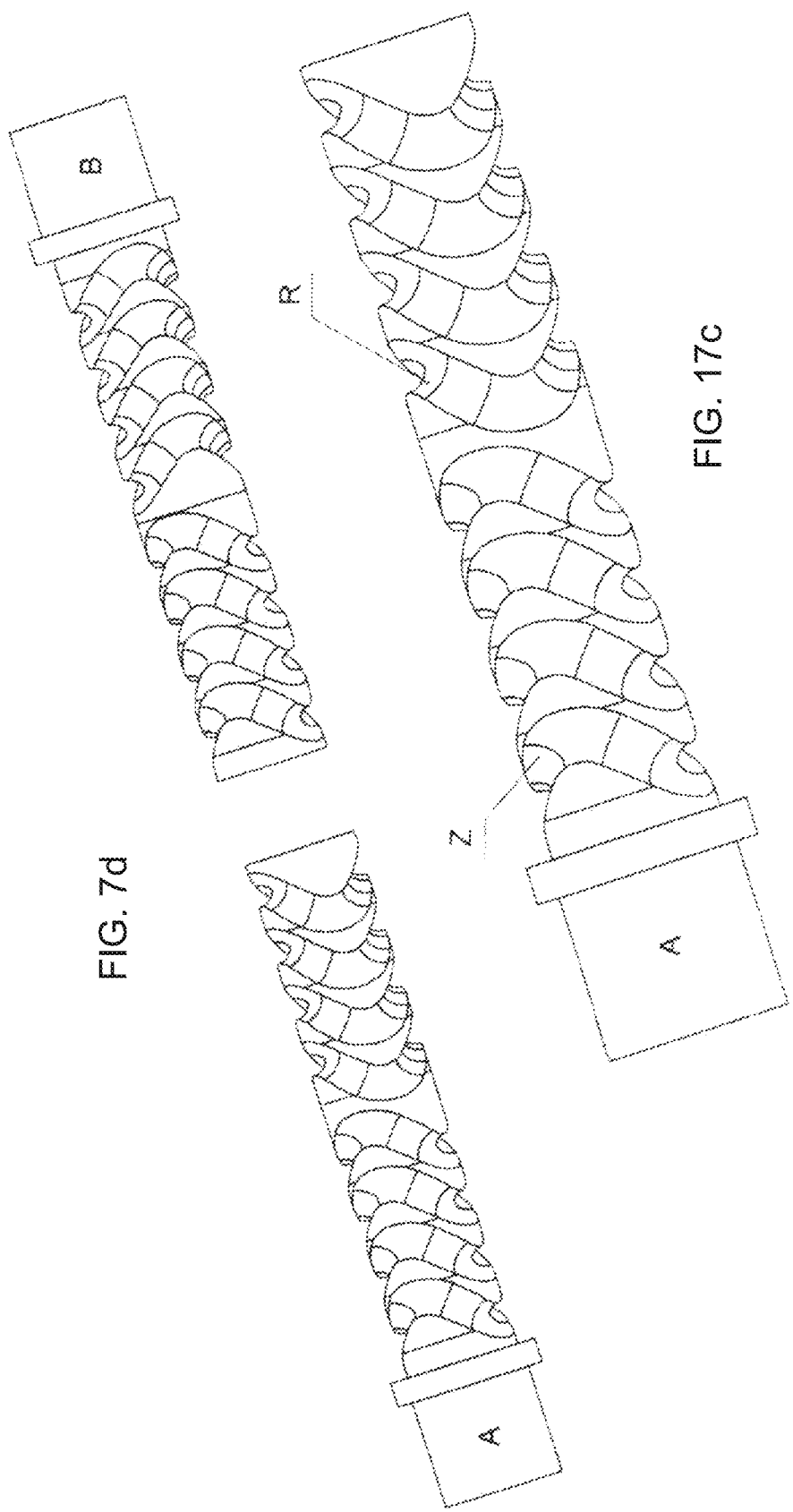

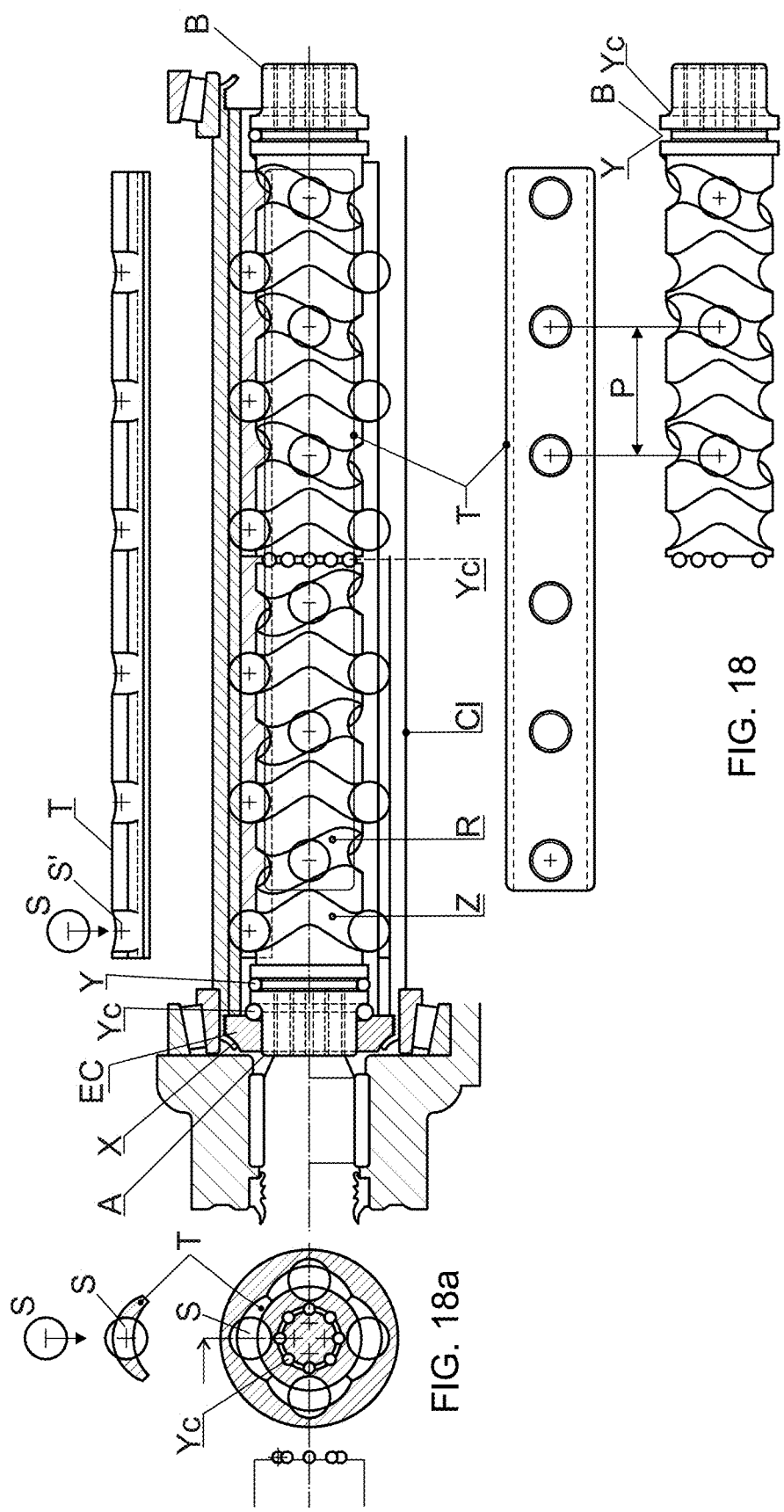

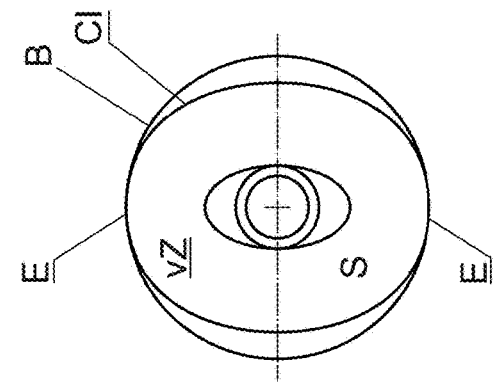
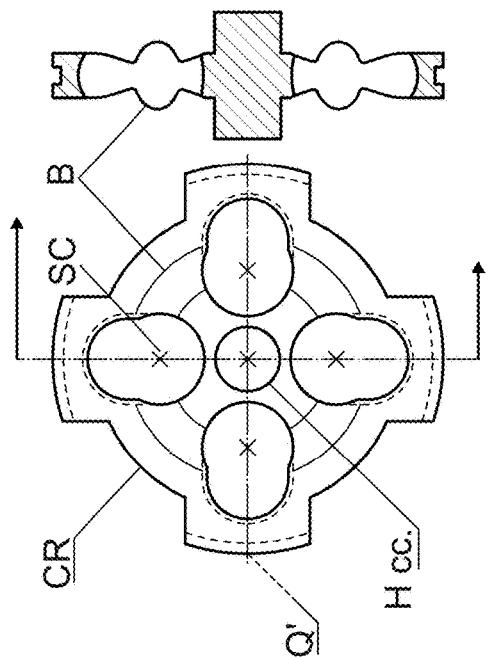
FIG. 23
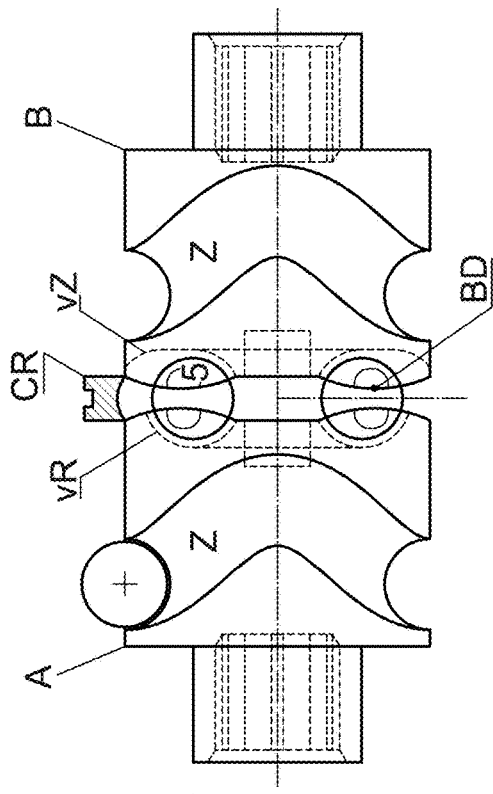
FIG. 24
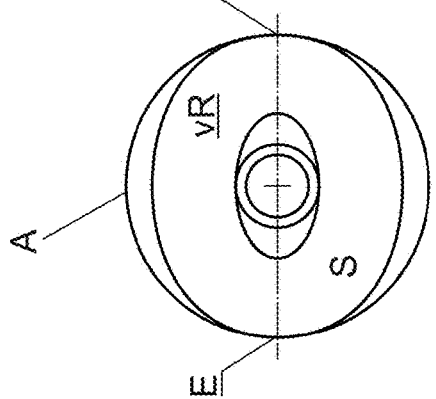

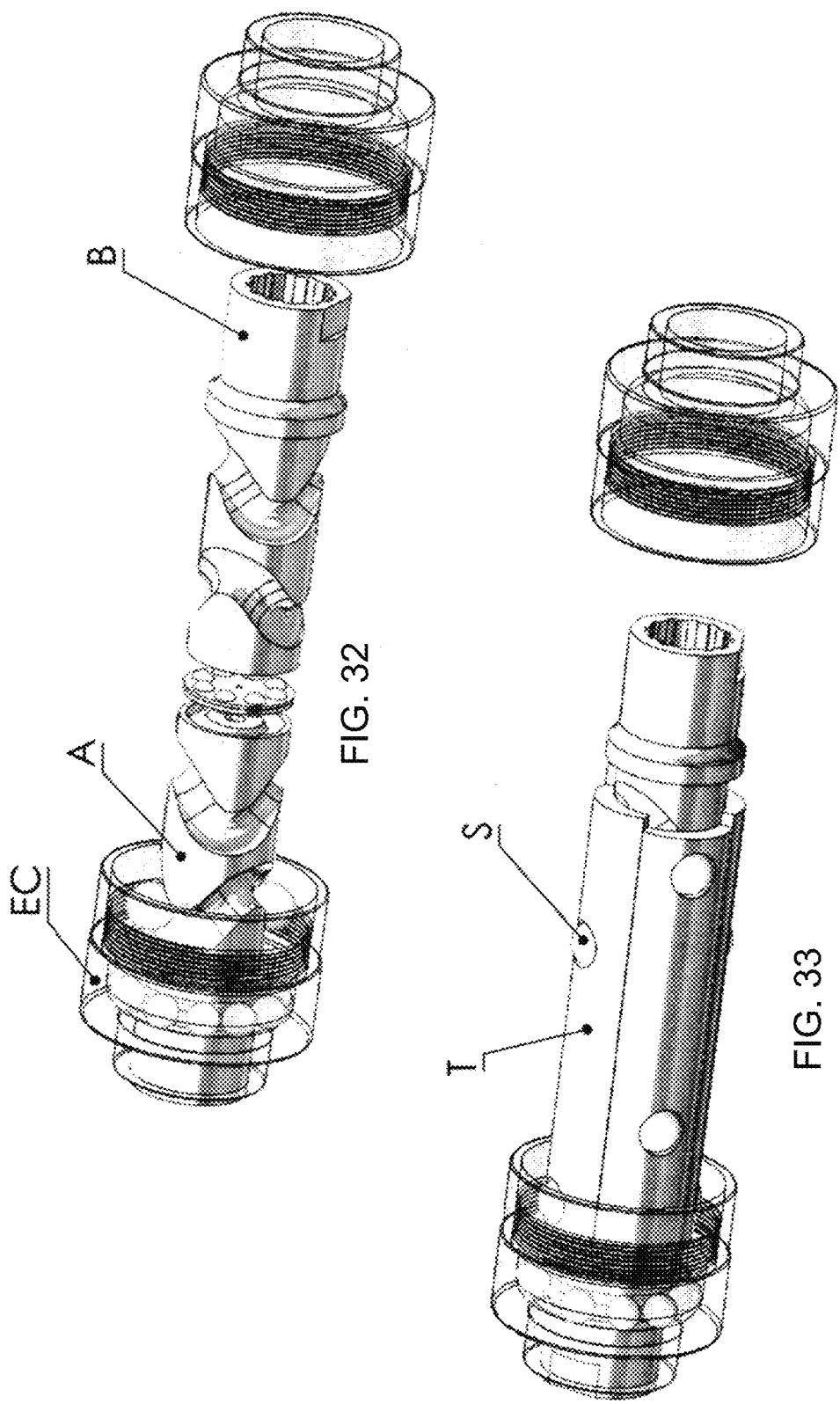

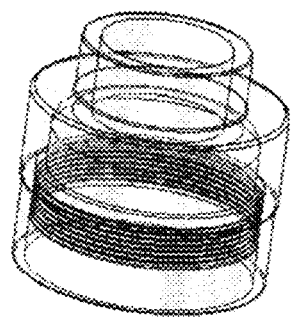
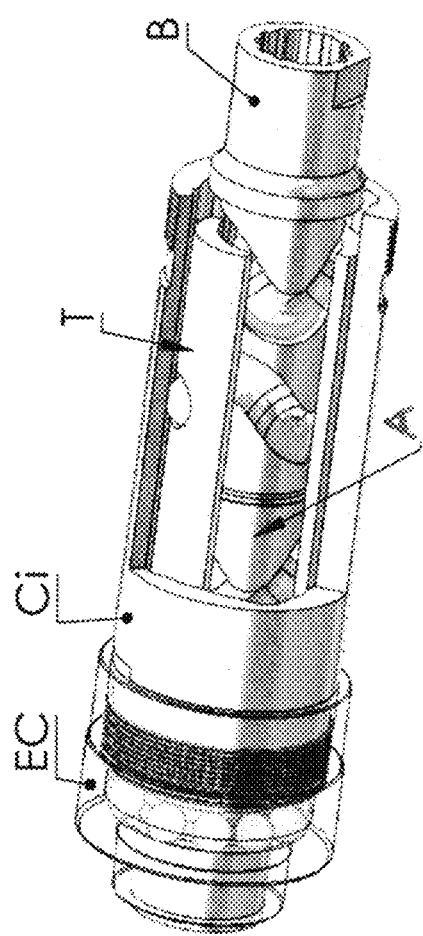
FIG. 34
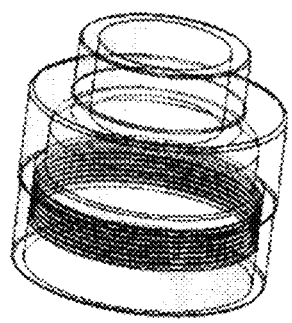
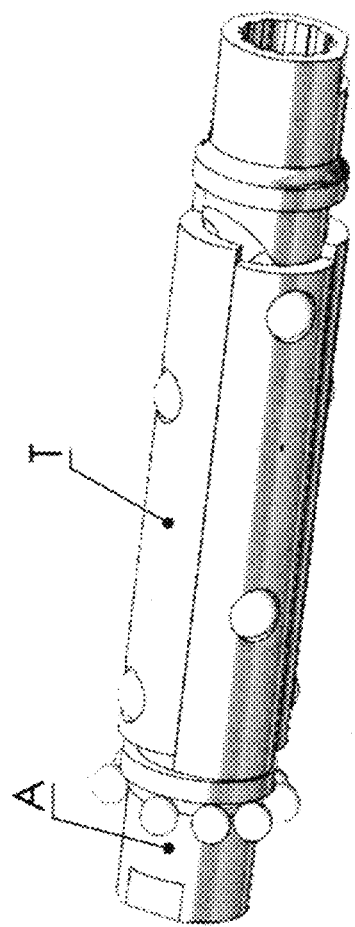
FIG. 35

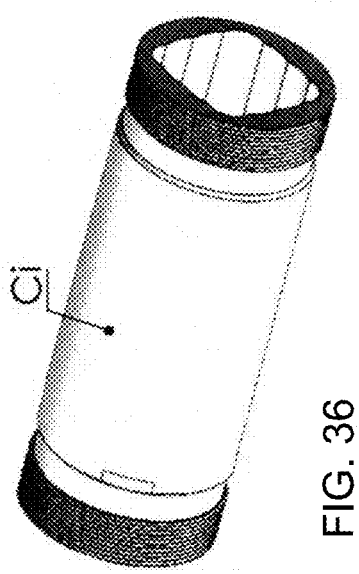
FIG. 36
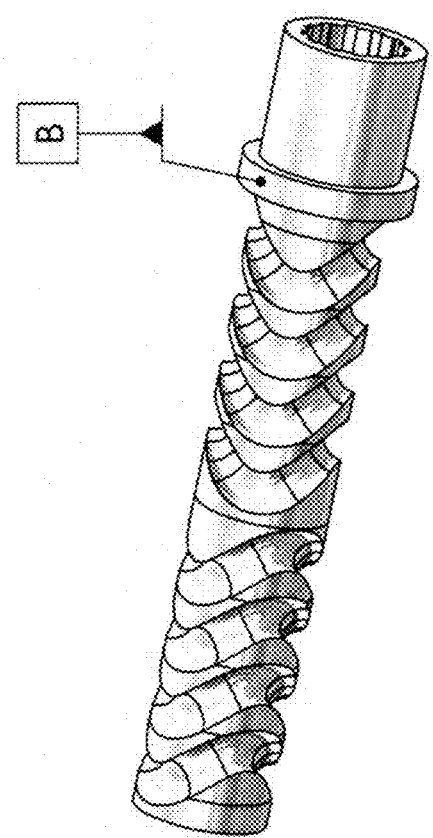
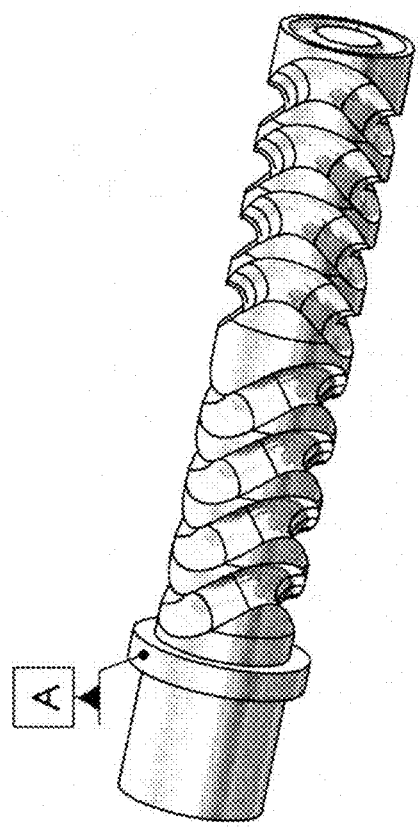
FIG. 37

DIFFERENTIAL WITH BALLS OR ROLLERS ON CONVERGENT ELLIPTICAL TRACKS

This application is the National Phase of International Application PCT/IT2021/050199 filed Jun. 25, 2021 which designated the U.S.

This application claims priority to Italian Patent Application No. 102020000015964 filed Jul. 10, 2020, which application is incorporated by reference herein.

There are not many alternative solutions to the gear differential, an attempt to make the ball differential was made by myself in the seventies of the last century.

The system involved the use of eccentric tracks with bearings, the invention was not successful, it was issued a patent on application No. 52910/70 A, patent number 9029531 based on the use of 2 eccentric tracks one inside the other.

The major car manufacturers discarded it due to the excessive cost of production as well as for the failure to solve some jamming problems and also for the excessive bulk on the diameter of the eccentrics in double overlap on two coplanar discs separated by a central cross.

Currently these problems have been solved in an optimal way so we believe that the new Invention is valid to obtain the patent grant for Industrial Invention.

Description of the theoretical and practical principle of the invention The differential derives from the observation that a cylinder cut at 45°, as is usually done when slicing a salami, the cut shows an elliptical section useful to suggest that its peripheral ellipse can become a valid path to generate an intersection if it comes mirrored and superimposed. In fact, by replacing the cylinder with two tubes, one inserted into the other and cut at approximately 45°, the idea is that this path turns out to be an endless rotational drive of an intersection, in a rhythmic and progressive way.

FIG. 1 shows a pipe and tube according to the present invention;

FIGS. 2 and 2' show an intersection of the pipe and tube of FIG. 1;

FIG. 3 shows a pipe and tube as in FIG. 1 with elliptical tracks;

FIG. 4 shows the tube with slots containing spheres;

Figure 6:
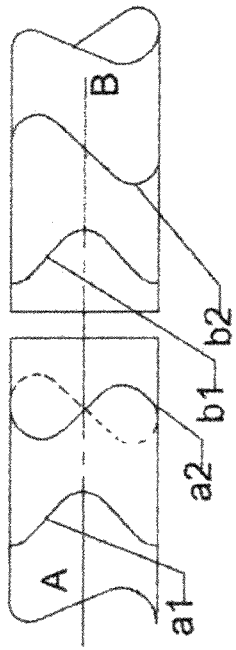
Figure 8:
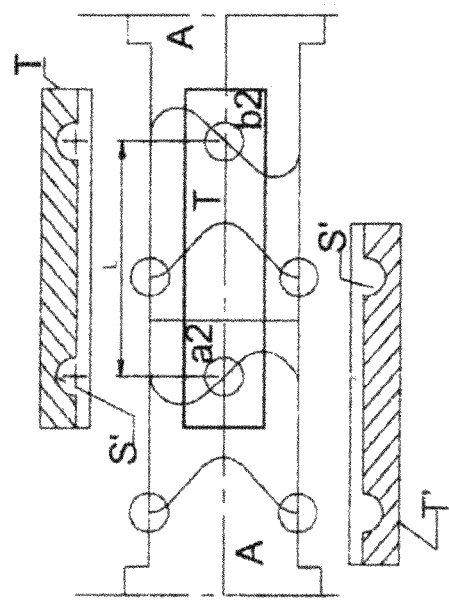
Figure 7:
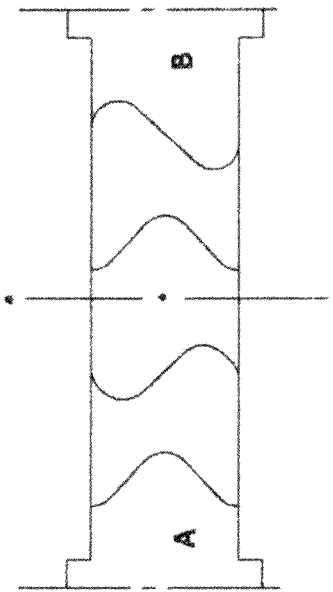
Figure 9E:
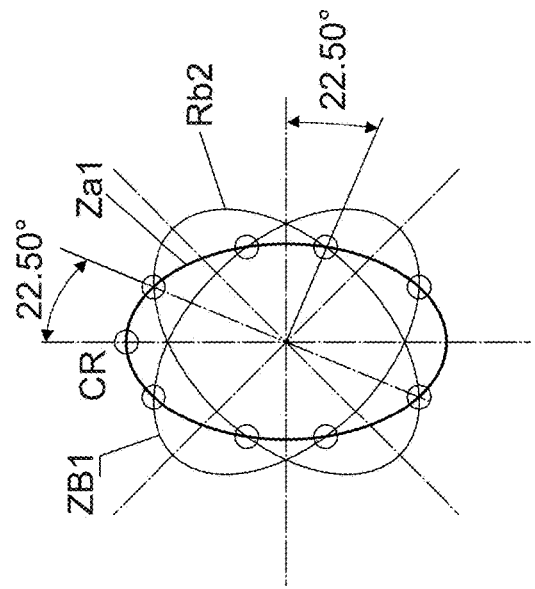
Figure 9D:
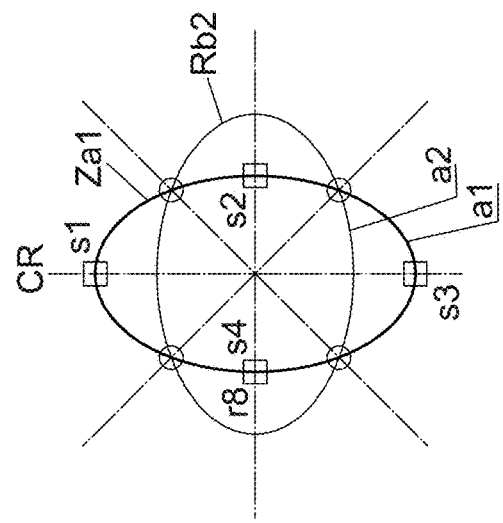
Figure 9:
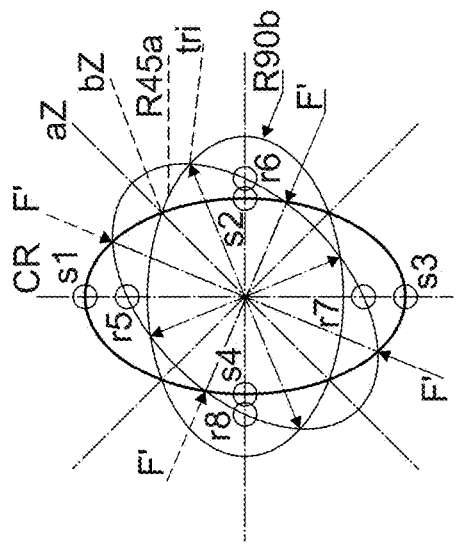
Figure 11:
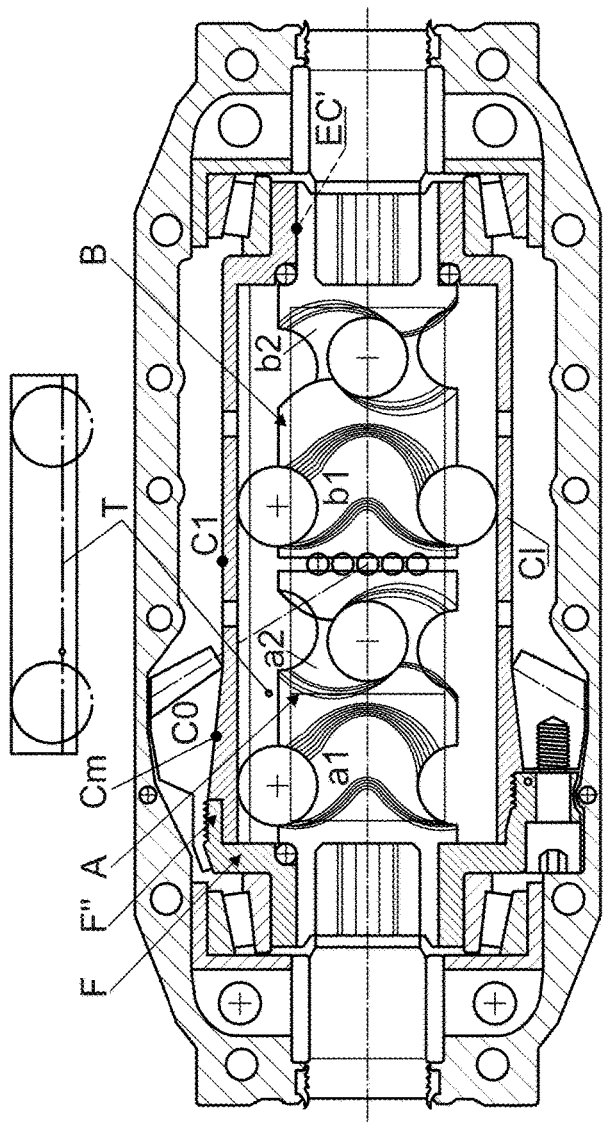
Figure 11A:
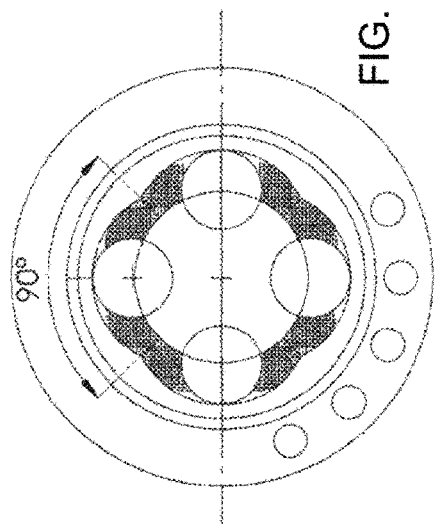
Figure 10:
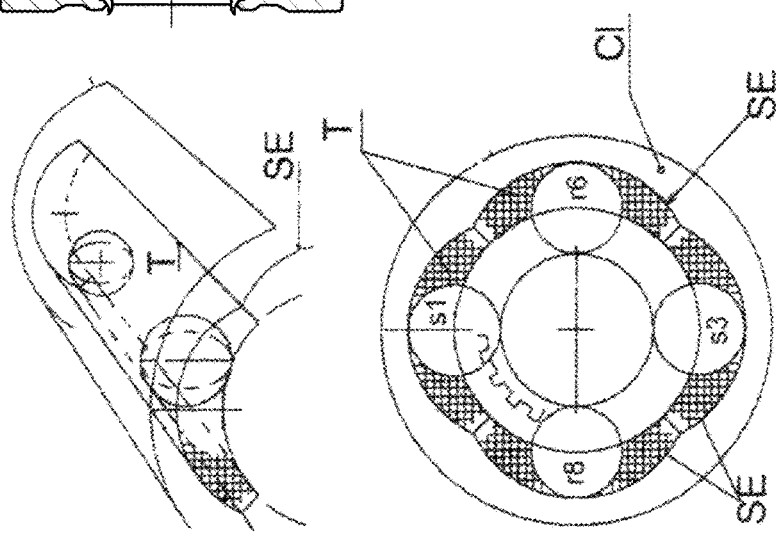
Figure 17B:
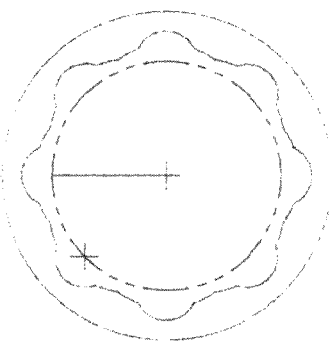
Figure 17A:
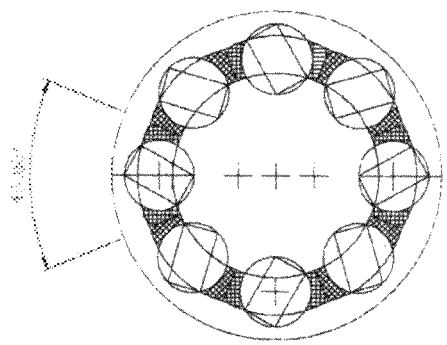
Figure 17:
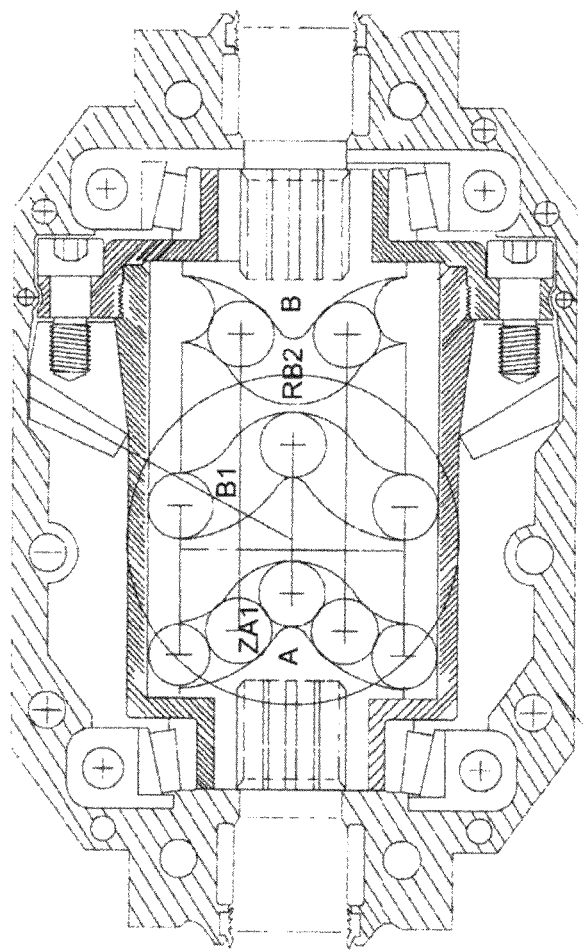
Figure 18B:
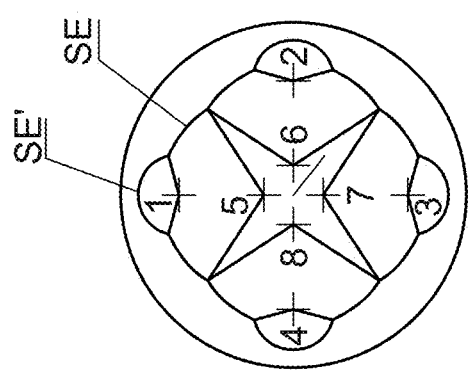
Figure 18C:
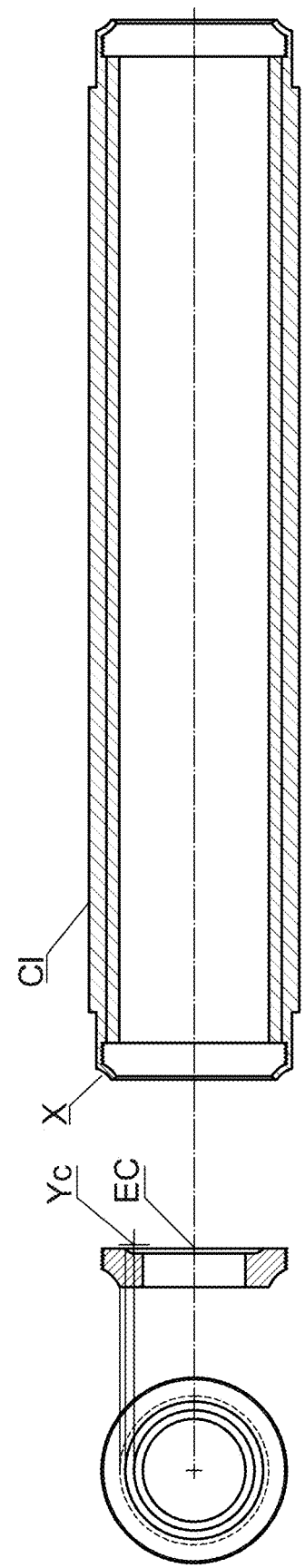
Figure 19:
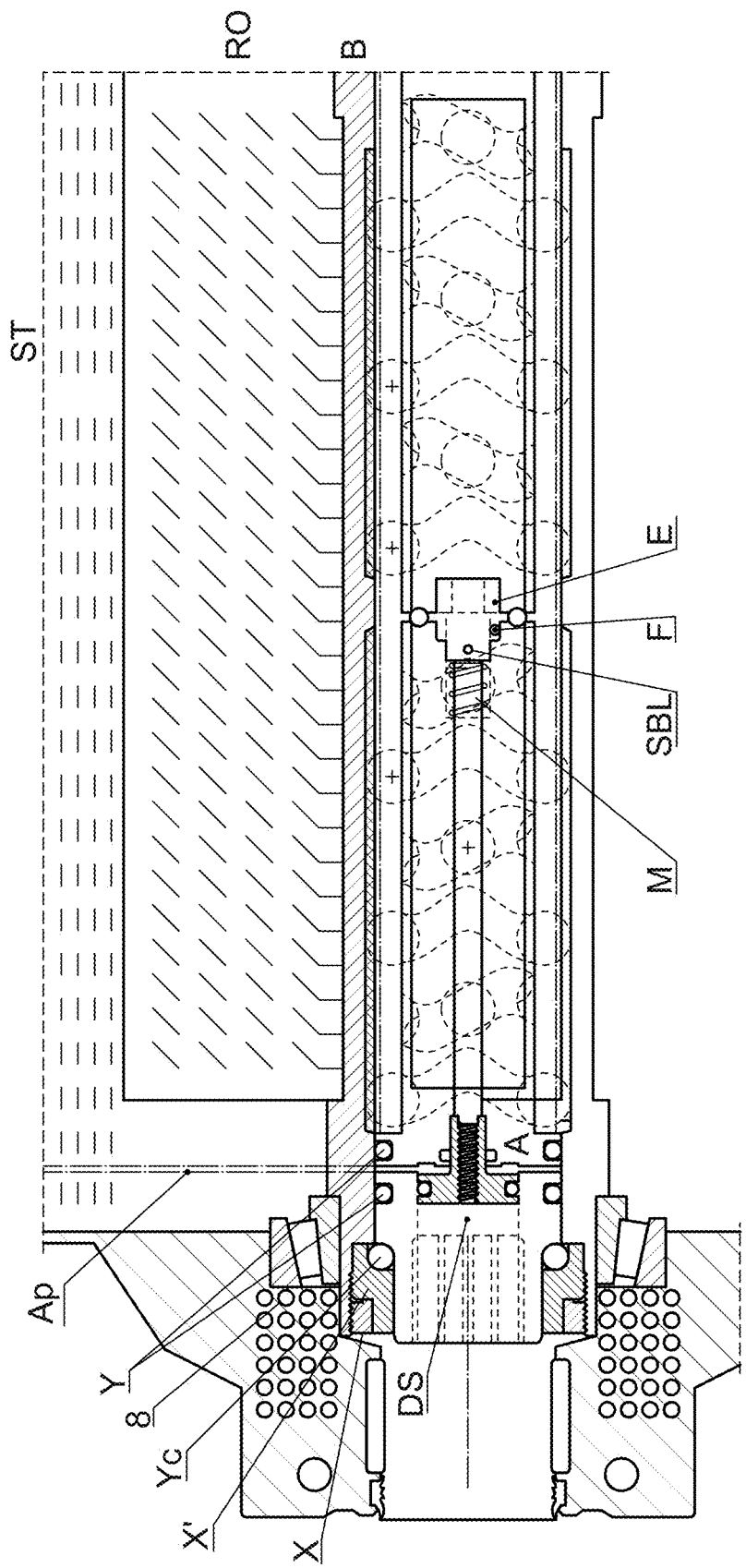
Figure 21:
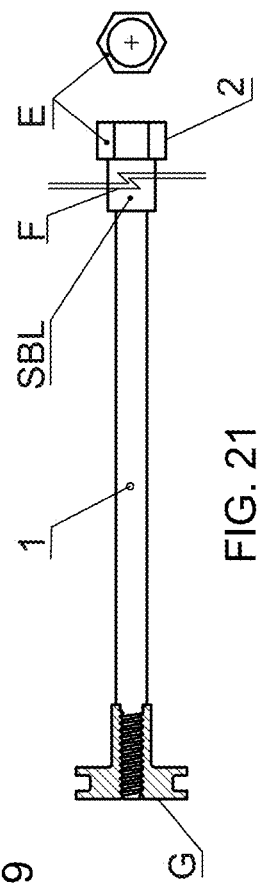
Figure 22:
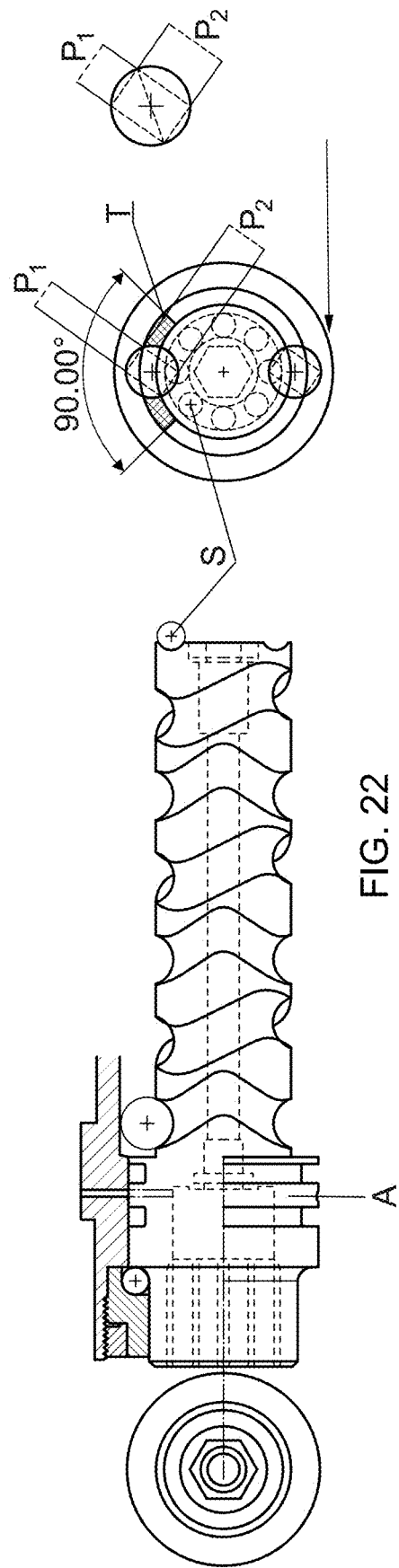
Figure 20:
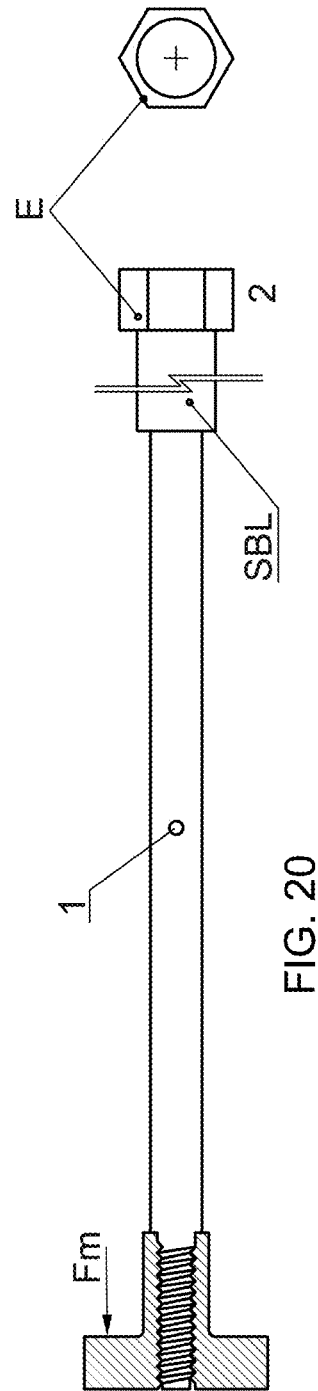
Figure 26:
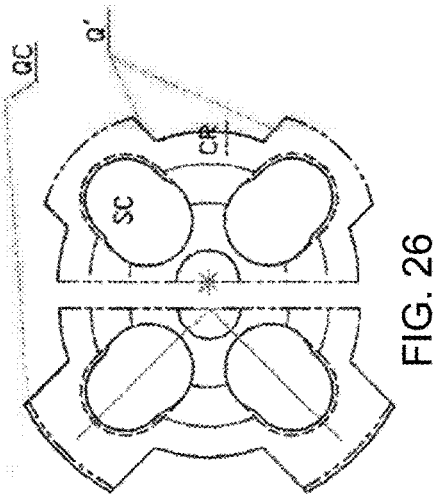
Figure 27:
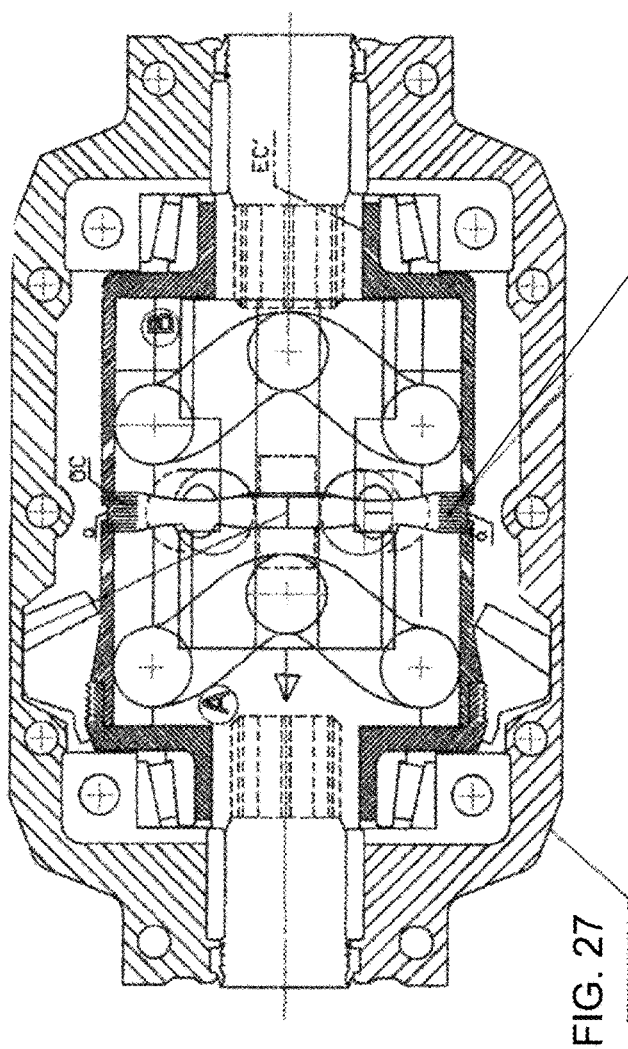
Figure 25:
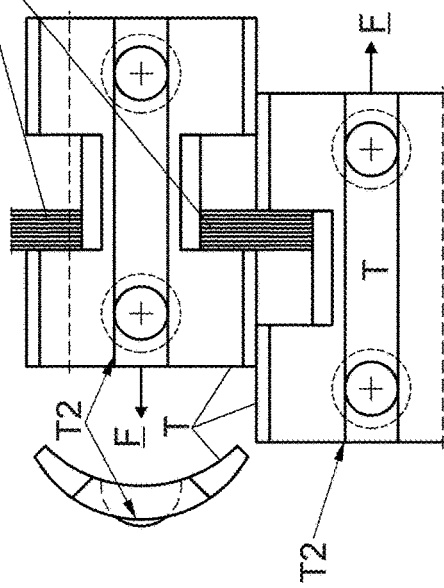
Figure 29:
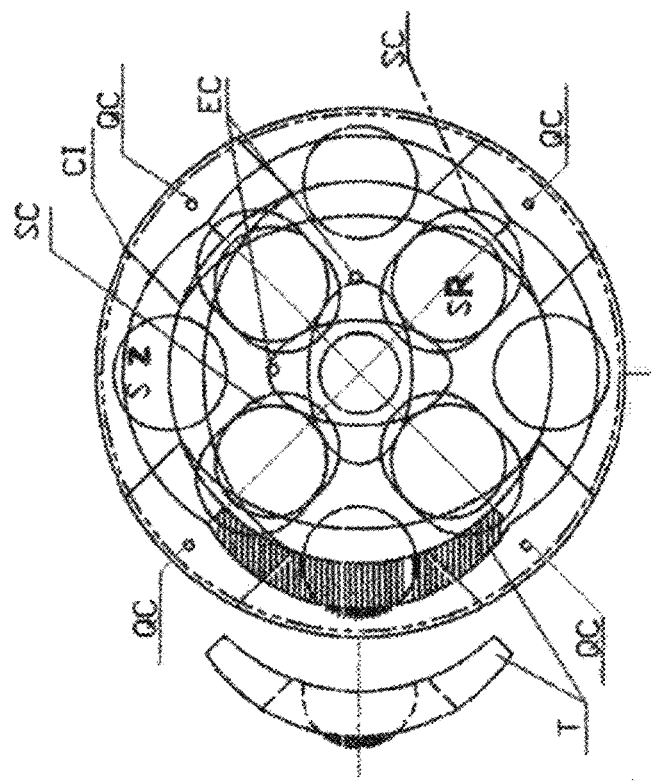
Figure 28:
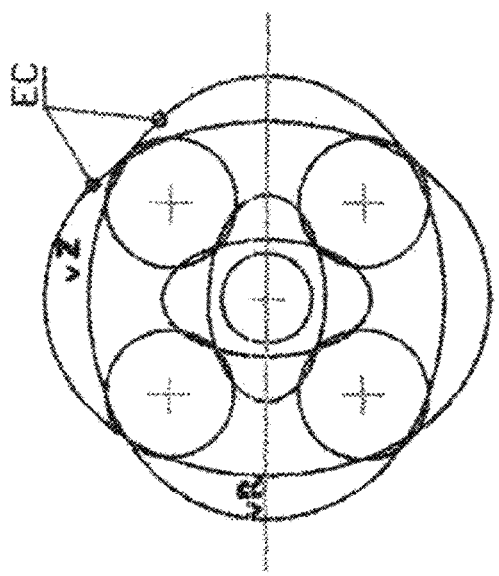
Figure 30:
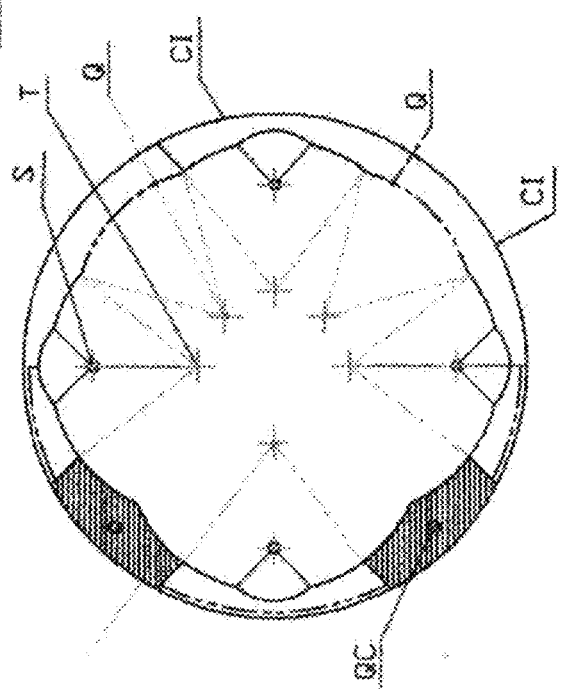

FIG. 6 highlights a trade-off where the shafts have become planetary shafts and no longer tubes;

FIG. 7 shows an alternative view of FIG. 6;

FIG. 8 shows spheres added to the embodiment of FIG. 7;

FIGS. 9 represent the theoretical problem and the solution that derives from the use of the semi-elliptical slopes with four spheres for each couple in two spheres for each couple;

FIGS. 10 show sections of a cylinder;

FIGS. 11 shows further sections of an assembly including the cylinder of FIG. 10;

FIG. 12 shows obtaining a translator from a steel section;

FIG. 13 shows a section of a core;

FIG. 14 shows a section of one embodiment of the present invention;

FIG. 15 shows a section of a further embodiment of the present invention;

FIG. 16 shows a cylinder with eight translators;

FIGS. 17 shows an embodiment in which the runway seems mirrored by further runways;

FIGS. 18 shows a section of the cylinder with four translators in which four spheres are positioned;

FIG. 19 shows a detail of a shaft in the assembly;

FIGS. 20-21 show further details of the shaft;

FIG. 22 shows a further embodiment;

FIG. 23 shows a further embodiment;

FIG. 24 shows shafts with opposed rounded planes with spheres;

FIG. 25 shows a lateral approach of two translators;

FIG. 26 shows a cross translator cut into two parts with four slots;

FIG. 27 shows a short differential with large spheres;

FIG. 28 shows a detail of FIG. 24;

FIG. 29 shows central spheres that slide in the grooves;

FIG. 30 shows arms of the cross;

FIG. 31 shows a detail of FIG. 11;

FIG. 32 shows a detail of the shaft;

FIG. 33 highlights the assembly of the four translators with spheres in the shafts;

FIG. 34 shows the assembly of the cylinder in cut form with spheres and ring nut;

FIG. 35 shows four translators in part separated from the assembly;

FIG. 36 shows the cylinder in which the internal sliding tracks of both translators and spheres can be seen; and FIG. 37 shows two long shafts with multiple tracks.

FIG. 1 represents the above mentioned principle, if pipe (A) remains stationary and pipe (B) rotates, the intersection is generated as in FIG. 2 where axis (H2) highlights the intersection point in which it is placed the symbol of a sphere (S). If tube (B) is rotated in one or the other direction, axis (H2) also moves to the right or to the left by dragging the cross point and the sphere symbol with itself.

The symbol of the sphere also moves up or down.

In fact if the intersection was made with two tubes in which two hemispherical tracks were engraved, one for each tube with interposition of a pair of spheres, they would be able to drag in relative rotation any tube interposed between the two tubes.

It is obvious to imagine the third tube with a double axial slot, longitudinal and opposed in parallel with the rotating axis of tubes (A) and (B). In this way the spheres can rotate the central tube that we will call (C) by dragging it in relative rotation between (A) and (B), without the ends of tubes (A), (B) and (C) moving from the rotation plane.

It should be noted that the intersections generated are two and opposite; in FIG. 2 the opposed intersection is not visible. Therefore a pair of tracks would move two spheres and vice versa the central tube will act simultaneously on two spheres; in FIG. 1 there is no intersection so you could not take advantage of the position that we would call neutral position or, dead center. In FIG. 3 two pairs of elliptical tracks per tube were drawn, the couples as a whole ensure that no dead center occurs together but that there is always an intersection to be exploited to obtain a towing relationship between pipes (A-B-C)

Looking at FIG. 3 we see that the inner tube (A), that could be a solid shaft, the central tube (C) on the left side develops with flange (C') while the real tube contains shaft (A), in turn tube (C) is contained in tube (aB) which ends on the right with shaft (B).

Two tracks (a1) and (a2) with concave profile suitable for the balls (S) are engraved in the tube (A), the two tracks are inclined and parallel. In the tube (aB) two other similar tracks are engraved but obtained in the inner side of the tube (aB) and they are not parallel but converging; track (b1) is exactly superimposed on track (a1) while track (b2) generates a superimposed intersection with track (a2); you can also see a sphere in the intersection (s2) and the groove (C").

The sphere is ⅓ contained in track (A2), ⅓ contained in axial slot (C") and ⅓ in track (b2) of the pipe (aB). A crown (Co) can be applied to the flange (C') of the tube (C), so by rotating the crown and tube (C) are dragged in rotation through the intersection (s2) engaged or with the ball and active tracks, both tube (A) and tube (aB).

The overlapping tracks on the left are neutral, but the two spheres are always engaged with the tube (C) so they enter the active towing phase as soon as one of the tubes (A) or (a B) slows down the rotation. Ultimately tubes (A) and (aB) can rotate through the crossings always in phase synchronized, or if one increases the rotation the other decreases it.

Note that while the corner forms in the intersection on the left, on the right side the corner of the intersection disappears for superposition of (a2) with (b2).

The width of the corners at the maximum intersection reach maximum efficiency if they are built with the inclined slopes in the center with an inclination of 45° so that the intersection that takes over will always be 90°.

Also in FIG. 3 intersection (a2) with (b2) must always be understood as two crossings for 2 spheres.

FIG. 4 shows the tube (C) in which the slots (s2) containing the spheres are obtained, each two opposing slots need a pair of spheres, the slots are opposite and parallel.

DESCRIPTION OF THE INVENTION IN ITS APPLICATIONS

As can be seen in the previous descriptive figures, any whole intersection made with an inclination of about 45°, develops with an excessive distance (E), measured length along the plane of the ellipse that joins two opposite generatrices of the shaft, see FIG. 2. So it can be seen that if the direction of the elliptical generatrix is reversed halfway, an equally valid path is formed from a mechanical point of view, but in a space reduced by approximately 50% (see FIG. 2.): but since, in fact, two progressive semi-ellipses are obtained. (see ellipse V' and the inversion line V and the rotation arrow v'), two crossings are created on the same polyline on each side for the application of two other spheres.

Figure 5:
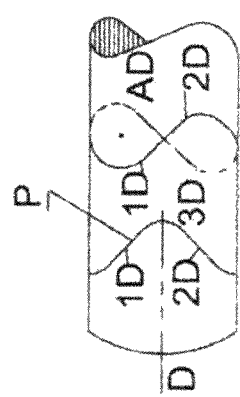
FIG. 5 shows the principle where on the half circle of the shaft, two inclined sections are ade.

Basically there will be four active spheres for each pair of halved ellipses, which we would call semi-ellipses. FIG. 5 shows the principle where on the half circle (D) of the shaft two inclined sections are made and in the middle section (1D) and (2D) two spheres plus two more can crossing on the opposite side or four spheres on the lines (1D-2D-3D-4D).

But this system can be well used if tube (C) is eliminated.

In FIGS. 5/6/7 and following the direction or sense of the elliptical generatrices are inverted with some real curves like the guidelines (M-N) of 3/8.

As mentioned, the spheres should be rotated by the tube (C) which interposed between (a) and (a B), being tube (C) too bulky and difficult to assemble, a way has been found to replace it with a simpler system, which performs the same function of dragging the balls. It has been replaced by translators (T).

The solution of introducing translators has the advantage that tube (C) also disappears, as such, only the right part remains (see FIG. 3), that is a new shaft in line opposite to shaft (A), with the same external shape, in addition to this the spheres are engaged for ½ in the tracks and for ½ in the translators instead of ⅓-⅓-⅓ with great advantage for traction.

The two shafts (A) and (B) will be operational and driven by the spheres.

In fact, even real crossings disappear.

In theory, to make a cross the pipes must be superimposed while the system metamorphosed with translators, the intersection becomes only offset and virtual.

FIG. 6 clearly highlights the trade-off where shafts (A) and (B) have become planetary shafts and no longer tubes, so they cannot be inserted one into the other but stay side by side and consecutive on the same construction axis.

The tracks of (A) a1 and (B) b1 are parallel to each other.

The track (a2) of the shaft (A) and the track (b2) of (B) are converging or mirrored.

If (b2) were superimposed on (a2) it would generate a crossing with (a2) of (A); moreover both track (a2) and track (b2) as well as being convergent are rotated radially by 45° with respect to tracks (a1) and (b1).

In FIG. 6, a dashed track has been drawn over track (a2) as a symbol that reproduces track (b2), which is really on the right, so the intersection is in the two distinct shafts only virtual, as already mentioned, and does not exist in reality.

In order to obtain it, it is sufficient to introduce the translator (T).

In FIG. 7 are shown the same shafts (A) and (B) opposed and approached to the center with dash and dot, so as to contrast each other and maintain the same rotation plane common; even at the ends of the shafts the containment plane is created, as it is seen from the hatching at the two ends of (A) and (B).

In the center of (a2) and (b2) of FIG. 8 there is the symbol of two spheres, which are inserted half into the translator (T) and half into the tracks (a2) and (b2)

Figure 9C:
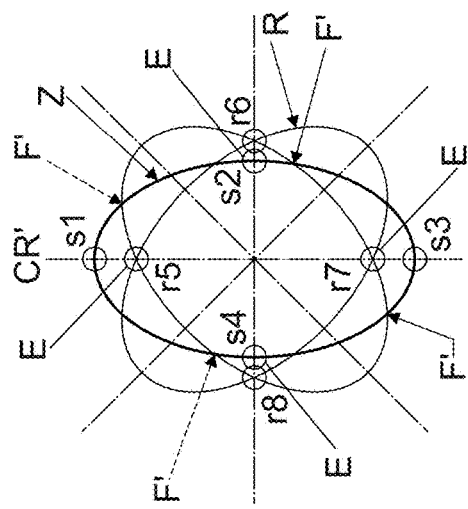

To better describe the semi-ellipses, figures are used as if the ellipses were not-folded in the middle but seen as in FIG. 2', with the arrow (V) that represents them in FIGS. 9-9c-9d. The ellipses that intersect in the various figures are also represented as belonging to the two shafts in transparent view along the axis of rotation on a plane.

FIG. 9 represents the theoretical problem and the solution that derives from the use of the semi-elliptical slopes with four spheres for each couple in two spheres for each couple.

In the figure we see 8 spheres, 4 for the tracks (Z) and 4 for the tracks (R), (zeta and erre are the names) necessary to better describe the invention which is explained below.

The track (Z) in bold develops for half a circumference to the right and left, then it converges and goes back; by right and left is meant as in the FIG. 5, detail (P); in FIG. 9

You can see the ellipse (Z) and the symbol of four spheres s1-s2-s3-s4.

It must be imagined that the tracks are two overlapping ie in neutral position, the bold ellipses indicate two overlapping tracks or one is of the shaft (A) and the other of the shaft (B), they are projected on the same rotation axis; this position is the dead point in which there is no crossing, so there is no towing in s1-s2-s3-s4.

Instead tracks (R) are crossed and can pull shafts (A) and (B) as one belongs to shaft (A) and one belongs to shaft (B). It should be remembered that the intersection is virtual as in FIG. 8 between translator (T), (a2) of (A) and (b2) of (B).

If we observe the line that forms the central cross (CR') with the horizontal axis we can see that the intersection of the tracks (R) and the respective spheres are in line with the spheres (s1-s2-s3-s4) of the tracks (Z), so that an incompatible orthogonal system is generated, which is explained later. Four spheres are superimposed on the other four and since all spheres must be held and controlled by the translators which cannot be superimposed as are around the circle; it is represented in FIG. 10 in which you can see only n. 4 translators (T) partially inserted in the tube (CI) with the relative spheres, see perspective of translator with two balls, one of which will be constrained halfway on the shaft (A) and the other will be constrained half on the shaft (B).

The spheres on the horizontal line belong to the tracks (R), (r6) and (r8), the spheres in vertical to the slopes (Z) or (s1) and (s3).

In FIG. 9 the spheres (s2) and (s4) of the tracks (Z) have been eliminated (E), and from tracks (R) the spheres (r5) and (r7) have been eliminated (E).

To better describe the rest of the invention, it is clarified that the term spheres must also be understood as rollers and vice versa.

In FIG. 8 the translator is drawn and symbolized also sectioned (T') and (T); in this case (T') belongs to tracks (Z) which are always parallel and the translator (T) belongs to tracks (R) which are always converging in the center and rotated.

As you can guess, if one of the shafts (A) or (B) rotates in the opposite way to the other shaft, it happens that the spheres already constrained by the translator keep the invariable position in length, i.e. well spaced—see distance (L) between the arrows—the spheres would allow such rotation being half-encased in their respective tracks, provided that the translator follow the rotation in one or the other direction and move to the new position longitudinally.

Note that the four translators are constrained by the tube (Cl) and slide in their seat longitudinal. Ultimately you get the same effect that occurred with the crossing in the FIG. 3, in which a single sphere participates ⅓ in the tube (A), ⅓ in the tube (C), ⅓ in the tube (aB), in the intersection it is evident that the tube (C) drives in rotation both the tube (A) and the tube (aB) and at the same time allows the free deceleration of one of the two and consequently the acceleration of the other, always on condition that a valid intersection is used between the tracks of (A) and (B).

The difference between the two examples lies in the fact that the differential effect in FIG. 3 is obtained between the slot of the tube (C) and the two overlapping tracks, using the track (b2) and (a2) with a single sphere, while in the example of FIG. 8, the differential effect is obtained using two spheres, bound to the tracks (a2) of shaft (A) and (b2) of shaft (B) of the translator (T), which as already mentioned replaces the tube (C) or in the slots (s2) of the tube, see FIG. 4.

The great advantage of the translator system is that the right half shaft tube (aB) in FIG. 3, leaves the overlap space to the translators (T) and the translators (T) are incorporated in the Cylinder (Cl) in FIG. 10, which contains the whole as SPHERES OR ROLLERS DIFFERENTIAL MOTION ON CONVERGENT SEMIELIPTIC TRACKS.

FIG. 10 of 1/8 shows the cylinder (Cl) in which the four seats can be seen as semicircular (Se) and the four translators (T) and a translator with two spheres inserted in its seat in perspective, see perspective figure, superimposed.

The detail (Cl) presents the set of 4 translators (T) partially embedded in the cylinder (Cl) engaged as per derivation expressed in FIG. 9 or (r8) with (r6) and (s1) with (s3) in FIG. 10.

The previous observations allow the realization of differentials whose characteristics and relative advantages will become clearer through the indicative and therefore non-limiting description of its preferred embodiments as represented in 2/8 where a schematic embodiment of a bridge differential is shown.

In 3/8 a second embodiment is presented as in the following tables a third shape and some variants of the differential in its industrial applications are represented.

FIG. 11 of 2/8, shows an assembly (11) consisting of a sectional casing (8) or one traditional non-binding differential box, inside which you can see shaft (A) opposed to shaft (B), contained by the cylinder (Cl) on which there are two ways of Crown assembly (Co) that are non-binding but only descriptive systems of economy of construction; at the top it can be seen that the cylinder is closed by a flange (F) such as cylinder cap (Cl) screwed by thread (F"), above the flange (F) the crown gripping the morse cone (Cm) is conified, at the head of the cylinder (Cl).

In the lower part (s0) you can see the screwing and locking with bolts.

It should be noted immediately that in the system below (s0) the flange is larger and more expensive also for the use of bolts; the advantage of the possibility of disassembly does not justify the greater cost.

In addition to the differential set, you can clearly see the shape and proportion that the details have.

The translators (T) drag two spheres each, the two concave tracks are built on each shaft for medium-sized spheres.

The short translator (Tc) is drawn at the bottom left and in the center the translator elongated (T) is drawn that is the translator is not symmetrical but on the one hand it is longer; the reason for this elongation is that the translators are assembled tangent to each other and they together form the tube containing shafts (A) and (B), see also figure section 10.

This way of containing shafts (A) and (B) is beyond valid and tenacious in system with four translators, whereby their elongation guarantees a better mechanical resistance to torsion, in translators (T) the spheres are also represented.

FIG. 12 shows how economical is the construction of the translators designed for the invention; they are obtained from a round drawn steel section.

The profile is already made to measure with a longitudinal cut drilled at the same time with milling, see tool (U), FIG. 13, that represents a progressive and variable shape of the core in the cross section of shafts (A) and (B).

In FIG. 10" you can see both spheres and different rollers, on the left it is highlighted as one sphere in the segment (TA) does not undergo tangent contact since the segment (TA) is a line traight, necessary to insert the sphere from underneath at the end of its stroke with the hole recirculation (F) in the cradle (cu), see FIG. 11T.

This stroke (TA) is well used if you replace the sphere with a threaded roller from above, which can also be partially conical in order to obtain a correct rotation as well as a more tenacious grip with the semi-elliptical tracks of the shafts, obtained close to each other; on the left is a train of spheres useful to reduce the friction between the translators, completely optional and not binding.

In FIGS. 11C and 31 of 2/8 there is a cylinder with interlocking teeth, and a union ring (ac) or a central section of 2 half cylinders (Cl) in a descriptive and non-descriptive way limitative in which 4 negative teeth (QC) are drawn and ruled into which the 4 are fitted arms of the cross (CR) if the cross is built with long arms, being installed in the center, unites the two half cylinders in a single piece which contains the shafts and translators, it must be said that the cross in practice performs the function of other translators but only for the elliptical tracks obtained on the front of the two shafts (A) and (B), in FIG. 11C a cross with 4 arms is schematized (QC') and with four grooves (SC) in which 4 spheres dedicated to the vertical elliptical tracks (VR) and (VZ) of the shafts, referred to in 7/8.

The differential can be obtained by miniaturization without losing the applied power in a similar differential with only two races per shaft and with very spheres or rollers.

This type of differential is indispensable when you have space in length and not on diameter.

The practical application is represented by the new electric traction technologies for electric cars, in them the same engine could contain the differential as a shaft rotating, and becoming an electro-differential shaft; 3/8 presents this application as an improvement for the electromechanics of this technological sector; another application could be represented by use in truck vehicles.

FIG. 14 represents the differential which we will call for convenience long differential, in it the shafts (A) and (B) are very elongated and the tracks are repetitive and the same type by type to be adequate to the torque to be transmitted.

In shaft (A) 5 tracks are engraved which we will call zero (Z) and also five other tracks which we will call rotated tracks (R), the number of tracks are explanatory and not limiting.

In particular, it should be noted that the aim of the following invention is to reduce the external diameter of the differential by more than 50% with the same torque transmitted by a differential traditional gear.

To achieve this, I made the invention without the gears of planetariums and satellites obtaining a cheaper and lower industrial product use of steel. This allows the invention to be used as a rotating shaft of an engine electric in use for the automotive industry, the shaft is already differentiated on both sides of the rotor whose overall dimensions do not increase the diameter of the supporting structure or the size of the windings or magnets.

The other advantage is obtained in the industrial production process entirely delegated to numerically controlled lathe; this produces a saving of 85% on the cost of skilled labor, generating a constant economy of scale particularly relevant in the differential called "elonged" well highlighted in 3/8 with FIGS. 14-15 and in the FIGS. 32-33-34-35-36-37 of 8/8.

As in the two system tracks per shaft, even in the system that we define as a track system multiple side by side, it should be noted that the 45° radial rotation of the incision of the piste (R) is obtained in both systems in the same way.

In the figures the tracks (Z) and the tracks (R) look different but they are just positioned differently so that tracks (Z) and tracks (R) are identical, their name derives only from the different engraving position.

The container tube (Cl) at its ends (EC) is closed with the screwed ferrules and conified by the cylinder, in this way shafts (A and B) remain constrained by the rotation planes and in perfect hermetic operation, see also 5/8.

4/8 represents the CAD of the shaft—type—with four tracks (Z) plus four tracks (R) and also the two opposing shafts whose tracks are proportionate to related spheres.

In 3/8 at the top left are drawn the 5 trace lines of the "centrosphere Z" tracks, as theorized, by wrapping the lines on the shaft the semi-ellipticals and converging formations are generated, the terminal (M) joins with the terminal (N). The group of lines belonging to each tree of the type R was drawn higher than half a curve, which indicates that once the construction of the track group (Z) has been completed, there is a shaft rotation of 45° before starting the incision of the slopes (R).

With this concept as a whole, the spheres can occupy precisely the cross circular formation 90°+90° that you can see in 1/8, FIG. 10, and in 7/8 FIG. 27, in 6/8 FIG. 19, in 2/8 FIG. 11, in 3/8 FIGS. 14-15, in 5/8 FIG. 18.

If we wanted to use eight translators, the rotation of the tracks (R) would be 90°, we will call this type of track (R90°) to distinguish it from the tracks named (R) which allows the use of double the spheres, in this case the spheres are found to take over not a 90° but at half stroke or 45°, so in the continuation of the differential towing a balanced intersection takes over where the zero point moves and rises towards 22.5° while the 45° group moves and falls towards 22.5°, the "zero" point means the neutral point, that is an instant of the rotation.

Although this choice is active with 4+4 balls per shaft, it is less sensitive than the 4 system translators, where the zero point moves and rises towards 45° meets with the other group that moves and descends from 90 to 45° that is to say that the system with four translators, although use only 2+2 spheres at each change of towing it is perfectly well balanced, always with the minimum grip at 45° and maximum 90° on 4 spheres.

The set of tracks (Z) and tracks (R) can also be created alternately, in this way we get a better resistance of the trees to torsion for which we would have, for each tree the arrangement highlighted in the FIG. 15 3/8, from left to right starts the track (Z) and then track (R), then (Z) and then (R) so on, and ending with the opposite track to the first.

FIG. 15 also highlights the following, both the tracks (Z) and the tracks (R) come engraved in the shafts (A) and (B) with a lesser depth, even half as much occurs for a normal differential with 4 rollers or spheres as shown in FIG. 11.

The reason is that in the long differential we use multiple tracks; the sum of the Thrusts of the rollers or spheres will give the puffing power, a bit like it happens on a screw with ball recirculation, in this case the translators are assigned a grip more than double compared to the depth of the semi-elliptical tracks on the shafts.

In FIG. 15 we see the line (a) which represents the depth of both the tracks (Z) that of the tracks (R), while above it can be seen that the depth of the gripping hole (b) on the translator (T) is much greater, but still to be evaluated.

The low depth of the tracks engraved on the shafts (A) and (B) is the great advantage that allows the core of the shafts (A) and (B), to become robust on very small axes in diameter, in which the minimum depth of the tracks does not decrease the power transported, since the number of tracks is the multiplication factor that the designer will use in order to calculate the total torque required.

If the cylinder container should be the base of the magnets or vice versa of the coils on an electric motor it will be faceted (SF) as seen from the section on the bottom left, see in 3/8.

FIG. 11T 2/8 highlights the particular precision of the hole (Fr) called "hole of pressure and recirculation" of the translators, which allows the spheres to discharge the axial centrifugal thrust derived from the resistance of the shafts. This thrust would be discharged in the rotation cradle (Cu) around the guide seat of the spheres in the translators, therefore with this expedient to the translators is subtracted the containment pressure of the spheres, which partly passes through the hole (Fr) of the translators (T) and discharges onto the cylinder since the internal measures intended for the spheres of the translators are calibrated in order to tangere without deforming. In conclusion, the translators have the task of guaranteeing and calibrating the exact distance between the two spheres or four spheres or six spheres and so on without undergoing the total sticking effect due to excessive pressure which we will call center-block pressure between translators and the sliding seats (Se) of the cylinder; it is obvious that this block center pressure is totally eliminated (E) using cylindrical rollers or low taper rollers, see example figure rollers and spheres (10") in 2/8.

FIG. 16 in 3/8 represents a cylinder with eight translators that use double of the rollers or spheres with respect to the system with four translators, already described.

The numbers 1-3-5-7 indicate the rollers on tracks (Z) and the numbers 2-4-6-8 indicate the rollers on tracks (R), better highlighted both on the right and on the left of the FIG. 16.

On the right the symbol of the reels for the tracks (Z) has been highlighted, on the left the symbol of rollers for the tracks (R), so if the tracks on the right are in neutral zero position (Z), and the active tracks (R) on the left, as you can imagine, the active tracks are positioned with the spheres or rollers at 45° interposed with the tracks (Z): it happens that the intersection of minimum traction will occur at about 22.5° as evidenced by the two opposite arrows at the top right, please note it is a crossing with eight spheres or rollers. (See FIG. 9D).

In fact, the tracks (Z) from the neutral position (O) begin to form an intersection and towards 22.5° they balance with the intersection, active which was at 45° and descends towards 22.5° to disappear at intersection (O), while the increasing intersection leads back to an ever increasing intersection active towards 45° and more up to the maximum crossing 90°.

In FIG. 9d in 1/8 the point of minimum and balanced traction formed is better seen from eight spheres of which four spheres at about 22.5° on the vertical ellipse at the top and bottom, and the another four in an average position inside closer to the center, all active; FIG. 9c shows the eight translators system again which is realized as already said by engraving the track (b2), rotated 90° with respect to the track (a2), while the track (a2) must be in the same position of the runway (a1).

This means that if (a1) and (a2) are equal, that is in shaft (A) it is sufficient to engrave a single track which performs a double function, therefore (a1) can form the crossings not only with (b1) but also with (b2), defined in the example (Rb2), the confirmation can be seen with FIG. 17 in which the runway (Rb2) seems mirrored by the runway (Za1) and the runway (B1).

We will call this track (Rb2) considering the vertical ellipse as track (Za1) FIG. 9d, the horizontal track as track (Rb2) FIG. 9c, you can see that the intersection is generated rotated by 45° with respect to the tracks (Z) in the neutral position at the intersection of FIG. 9c.

While the four spheres are positioned interposed, in the cross that we have symbolized with four squares, in practice there are eight positions for eight spheres, therefore eight translators perfectly equidistant every 45° with the symbol of squares and spheres.

Their operation is just as balanced as the four out of four shifters system spheres but only more powerful. But not only that, one of the trees as it uses a track for two functions, such a shaft can be shorter than 50%, in this case the advantage is evident in the realize the differential called short, instead of four tracks we would have three tracks, one for the shaft (A) and two for the shaft (B) or vice versa in FIG. 17 in 4/8 shows the differential with three tracks that we will call (short shorter) in which there are 5 lines horizontals that join the sphere centers two by two, which indicate the grip of the relative ones translators, the lines are the symbol of the translators on sight so as not to complicate the figure, three lines are not seen being behind, not in sight.

In the differential that we will call long we want to achieve the miniaturization so we will use only four translators that occupy the entire circumference on a diameter very small so you will not have this opportunity of 8 translators.

In FIG. 14 and in FIG. 15 it has been shown that the translators (T) are always shorter of the container tubes (Cl) as much as is the translation stroke of the semi-elliptical tracks, stroke highlighted by the arrows (FT).

In the most sophisticated differentials where sliding friction is excessive it can be avoided creating four junction lines (Q") that join the cylindrical curved seats for which it is possible to interpose a train of spheres (S) that separate the translators, on which it comes obtained the concave seat as in the bearings, the arrangement is equally valid a counteract the thrust center block while improving the smoothness of the translators (T) in which the sliding friction is transformed into rolling.

The FIG. 11T and (10") shows the section of the translators (T) with slots for bearings and spheres (s). 5/8 shows again the differential for miniaturization with multiple tracks, the which guarantees a great pulling power no less than the differential with large spheres on four translators in four semi-elliptical tracks.

As already mentioned, the goal is to use minimum shaft diameters without losing value of torque transmission. 5/8 at the top left of the FIG. 18a shows the section of the cylinder with four translators in which four spheres guarantee the perfect use of four translators. As can be seen in the FIG. 18a the four spheres pass through the translators (T) and engage with the guide track grooves in the cylinder, this means that the cylinder drags the balls (S) without the mediation of translators (T) for the rotary pulling thrust in this way the spherical masses (S) drag shafts without generating the thrusts that we have defined as center of block on the translators.

The shifters have only the task of keeping the gauge for the intersection of semi-elliptical tracks converging, in this way the translators are totally hooked to the spheres without suffering even minimal bonding forces, even in the rotary thrust phase. But for the better specialize the invention and in the face of any deformations that would be generated in the arc of the tracks dedicated to the spheres, we have also kept the tracks for the translators, with this a perfect symmetry is generated, each track for spheres is located within the largest track or the track of the translators.

The FIG. 18b shows the centers of the four tracks for the spheres thus numbered 1-2-3-4 and the center of the tracks for translators (T) with n. 5-6-7-8, as you can see each track for sphere is in the center of another track for translators. The four points of the star in the center represent the meeting of the four tracks of the translators (T).

FIG. 18 is partially sectioned mixed in which it is highlighted that the tree (A) hermetically closes the cylinder with round gasket (y) of non-limiting shape but only descriptive, in order to contain the lubricant inside the cylinder, on the left we highlight the mechanical closure with screwed and crimped counter-thrust ring nut on anti-unscrewing pressure cradle. In FIG. 17 the ring nut is different and unique and is screwed in the circumference outside the cylinder. Also in the figures in 8/8 the ferrules are screwed into the outer circumference of the cylinder (Cl).

The system guarantees the invention for a long life without maintenance, not limiting but with an objective guarantee.

Between the shaft (A) and the shaft (B) in the center a series of spheres are assembled to create the counter thrust bearing (Yc); visible also in FIG. 18a, this arrangement is useful to make the differential perfectly self-centering as well as more sensitive.

The bearing balls (Yc) are also installed between the nuts (EC) and the shafts, the bearing race can be seen clearly in the screw nut (EC) at the bottom 5/8, the same seat can be seen in the shaft (B) in which you can also see the contrasting spheres in the center.

As you can see, the central translator (T) is dedicated to the six spheres of the tracks (R).

Above the sectioned translator is dedicated to the tracks (Z) in which it is highlighted that the sphere (s) is inserted from above, see arrow.

On the left you can see the section of the translator (T) and also the sphere (s) that is positioned from the top to the center of the translator in order to serve the three elements: the cylinder (Cl), the shifter (T) and shafts (A) and (B).

In the center on the right you can see the shaft (B) which indicates the position for the gasket hermetic (Y), below is the cylinder (Cl) with sectioned ring nut, it is obvious that the cradle deformation (x) occurs after screwing the ring nut (EC).

As you can see, the essential part of the differential consists of a few elements, namely: cylinder, translators, balls, shafts, ring nuts and gaskets and any locking solenoid (SBL), of which each detail allows various characterizing applications.

6/8 shows the differential lock with the particular solenoid shaft (SBL), it is in the center between the two trees (A) and (B).

The left part of the detail finds the shaft (A) drilled that accommodates the side (1), on the right side the terminal (E) is inserted on the shaft (B).

In FIG. 19 the detail (E) is inserted inside the shaft (B) which offers the hexagonal shape of the grip. The hexagonal part of the solenoid, sliding to the left, fits into the seat of the same shape (F) in the shaft (A) so that one part of the hexagon always remains in the right guide on (B) and the other part sliding on the left it engages the shaft (A).

In this way the two shafts become a single shaft and the differential moves in unison, at the center of the shafts, on the left, four rows of coil are drawn at the top of the fixed casing (8) to indicate the electric circuit of a solenoid which generates an attractive magnetic field when the electric current passes pulls the anchor (FM) of the solenoid shaft (SBS) to the left, to join the two shafts (A) and (B) in a single shaft; the contrast spring (M) brings everything back to rest with the opening of the electrical circuit.

Always at the top, with the inclined dashes it is meant that, as in the Brushless gear, magnets are integral not only with the rotor also in the facets (SF) with the differential cylinder which we have defined as an electro differential spheres shaft.

The flat lines symbolize the stator integral with the cover on which it is seen the thrust bearings and the caliber rollers for shaft A, stator and rotor which can also be reversed.

The whole is designed as descriptive and non-limiting reference points of the invention.

FIG. 20 shows the magnetic iron terminal (FM) as an anchor, screwed into the stem (1) of the solenoid (SBL).

FIG. 21 presents a pneumatically operated solenoid of shape and grooves for the relative rubber pads, and the air passage (Ap) on the crankcase.

Finally in FIG. 22 an application is highlighted in a descriptive and non-limiting way ultra-defined sphere, so it can always be well calibrated of any diameter; in this calibration it is possible to distribute the guide curves in the two tangent points grip in the cylinder and the curves obtained in the drive shafts.

The figure shows the figure and thrust direction, which is placed on a ortogonal building where all forces coincide with the center of the sphere (S) and all components are parallel, P1 and P2.

In this type of ultra definition the translators T are not guided in the longitudinal tracks of the cylinder but are guided by the spheres and are built concentric to the shafts (A-B) and cylinder (Cl) and have a uniform thickness such as to fill the gap between shafts and cylinder.

In 7/8, FIG. 27 represents the short differential with large spheres, which uses shafts A and B of the same size, with a single track obtained in the circumferences, see FIG. 24.

In the circumferences of the shafts (A) and (B) the tracks are of type Z parallel to each other, this means that the position as drawn does not generate intersections and therefore there is no towing, the intersection is obtained by engraving the elliptical tracks for the intersection on the front of the shafts (A) and (B), for which the towing must be generated by the elliptical tracks obtained on the opposing convex fronts of the shafts, and, as seen on the left of the central figure, the whole ellipse (EC) is obtained horizontally, while on the right it is obtained vertically, and the intersection will form exactly at 45° that is they are four crossings with four spheres, as in FIG. 28.

In the central FIG. 24 of the shafts you can see the opposed rounded planes (BO) in which two spheres (5) of the four that generate the intersection are drawn as mentioned above better highlighted in FIG. 28, the four spheres are positioned at the center of the intersections between the two raceways (VR) of the shaft (A) and (Vz) of the shaft (B).

In FIG. 26 we see the cross translator cut into two parts with its four slots (SC), in the cross two arms (Qc) on the left are drawn longer but only in an alternative way and not limiting as they could be even shorter (Q') if the cylinder were whole. Also in FIG. 30 it can be seen that if the 4 arms of the cross were the same and long, they would fit into the joints (Qc) of FIG. 30 and the cylinder would be obtained in two parts while the arms would be short (Q'). If the cylinder were made in a single piece, these arms would find the joints in the tracks (Q) of the long and entire cylinder formed in a single piece, see visible joints in FIG. 30.

The four central spheres (Sr) FIG. 29 slide in the grooves and are simultaneously constrained in the vertical elliptical track (VR) of the shaft (A) and (VZ) of the shaft (B) tracks highlighted as in FIG. 24 and in the slots (Sc).

In FIG. 23 the same cross translator is also seen in vertical section with equal arms.

The cross (CR) occupies the space between the two shafts (A) and (B), but is constrained to the cylinder (Cl) in a stable way or in the joints (QC) of the cylinder or in the raceways (Q). At the center of the shafts it freewheel and concentric with the axis (H) of the shaft (CC).

In FIG. 29 all four points (QC) of constraint with the cylinder are shown in a descriptive and non-limiting mode, and the four spheres (SR) are visible in the tow phase, between the cross central (CR) in the elliptical tracks (EC) called (VR) for the shaft (A) and (VZ) for the shaft (B).

In the central FIG. 24 only two symbolically smaller spheres are drawn for better represent the gripping position between (A) and (B) interposed on the central (CR) between the track (VR) of (A) and (VZ) of (B).

FIG. 25 represents the lateral approach of two translators (T) and between one and the other the terminal part (QC) of the cross which passes into the exhaust on the sides of the translators (T), to be constrained in the cylinder (Cl), the two arrows (F) indicate the direction of movement of the translators (T), while the terminal (QC) of the cross remains fixed on (Cl); as you can see the central part of the translators (T) is unloaded to allow the passage and attachment of the cross to the cylinder with its arms.

In FIG. 30 we see the cylinder (Cl) which can also be half a cylinder with the center-axis of the tracks (S) for the spheres and the center-axis for the translators (T) and the center-axis of the guide tracks (0) and the latter can only be obtained up to half the length of the cylinder (Cl).

The rounded parts (BO), also called ciambellate, in a descriptive and non-limiting way, of the shafts (A) and (B) allow the better use of the spheres for towing between the cross translator which is also convex at points (B), FIG. 23-24, the convexity (B) finds space in the concavities of the tracks (VR) and (VZ) of the convex shafts (A) and (B), similarly the ringed walls of the shafts (A) and (B) determine the variable thickness of the mating cross.

As you can see, this system of obtaining the elliptical tracks in the two opposite fronts of the shafts (A) and (B), where (VR) is rotated 90° relative to (VZ), is the same as in the eight system, translators in which the tracks (R) are rotated by 90° with respect to the tracks (Z), so in the tracks (Z) of the circumferences four spheres are applied to each track of (A) and (B), the tracks are parallel to each other. Two spheres in the central FIG. 24 are not visible.

The fact of having the tracks (VZ) and (VR) opposite each other avoids having eight balls in one single shaft track (A) as in 4/8 and at the same time allows the differential to be made with shafts equal in length.

The system is more compact and equally well balanced but cheaper, being of further reduced dimensions.

It should be noted that the elliptical tracks on the opposite fronts of the trees can overflow the circumference at points (E), as the overlapping of the tracks in those points does not generate traction but only synchronism between balls and cross (CR).

This way of obtaining the elliptical tracks (EC) in order to have two tracks synchronized with the translator, central cross and the other two tracks in the circumferences of the shafts (A) and (B), synchronized with the four translators (T), allows the mixed use of spheres in the center between the shafts (A) and (B), and of rollers in the elliptical tracks of the circumferences, in particular of rollers of the flared type as presented in the translator (T) of the FIG. 10" in 2/8. Note that if the entire cylinder is made up of two half cylinders as shown in the diagram 31 in 2/8, the positive teeth (B) belong to the half cylinder (Cib) while the negative ones belong to the half cylinder (Cia) and the elastic ring (Ac) fits between the two half cylinders and the cross in the recess (C) of the three details. Everything is presented in a non-limiting but only descriptive way.

To better define the differential with elliptical tracks in 1/8 it was noted that each pair of ellipses forms number 4 crossings and the pairs of ellipses are 2, i.e. the differential to be able to work must have at least two pairs of ellipses per shaft, in which the crossings are 8 and since the diameter of the differential must be as small as possible the smallest differential with four translators has occurred.

As noted in the theoretical design 9 we used two spheres on two crossings of the first pair and two other spheres on the other two crossings of the second pair as in FIG. 10; in fact a total of four crossings of the four-shift differential were not used.

So only in the description of the 8-shift differential we used the crossings available with two pairs of ellipses and a more economical way to obtain a type of 8-shift differential was transformed.

Then in the construction of the differential with three elliptical tracks it was explained that in the shaft (A) uses a single elliptical track (Z) with respect to the differential of FIG. 11, and in shaft (B) it uses two elliptical tracks, one of the type (Z) and the other of the type (R), since the shaft (A) is as if with its single track (Z) forms all the intersections, 4 of which with the track (Z) of the shaft (B) and 4 with the track (R90) always of the shaft (B).

Therefore we have translators that engage 8 spheres on (A) and 8 spheres on (B) of which four of the shaft (B) in the track (Z) and four in the track (R).

This has meant that eight translators around a circle are placed side by side every 45°, and every shifter works in pairs with the other opposite shifter on the other side of the diameter of the circle on which it is installed and moves in the same direction in unison with its twin.

Now the following should be observed: if in shaft (A) we use both tracks, we could do it and couple the track (R 45°) with a track (Z) of the shaft (B), this is possible in how much in this differential the track (R) of (B) is rotated by 90°, as explained in system a 8 translators, for which the track of (A) (R 45°) must be coupled with the track (Z) of (B) which has only four balls. The track is in fact engraved with a radial rotation of 45° and creates the intersection placed at 22.5° or four intersections at 22.5° with the track (Z) of (B) on one side only, see arrows (F') in FIG. 9.

Therefore we would have the track (R) of the shaft (A) coupled with the track (Z) of (B) and the translators will be 12 translators, i.e. the number of balls increases the transmitted torque.

In conclusion, the differential theoretically forms many crossing points, all of which can be exploited with the translator system, each of which can be dedicated to an intersection formed by the elliptical tracks made in the circumferences of the shafts (A) and (B).

In these cases the spheres increase and they can be smaller and smaller as explained in the differential for miniaturization and carry the right torque. It can be shown that the increase in the number of translators can be inversely proportional to the size of the diameter of the spheres, with the same Torque transmitted.

The differential will have 12 translators, and in the track (Z) of the shaft (A) it will have 8 spheres like the differential with 8 translators and 4 spheres in the track (R45°), while in the shaft (B) it will have 8 spheres in the tracks (Z), 4 more than the 8-shift differential and 4 spheres in the tracks (R90°) and the shafts (A) and (B) will be equal in length.

This principle of the track (R 90°) on the shaft (B) can further expand to 16 translators, one every 22.5°, in which the track (R 45°) of (A) is also coupled with the track (R90°) of (B), completing the alternative taps available, so the 16-shift differential will work as a powerful differential towed by 32 spheres, or 16 for the shaft (A) and 16 for the shaft (B).

PLEASE NOTE in 1/9 FIG. 9 describes the use of 4 translators; in the same scheme of FIG. 9, we introduced 4 arrows (F') which represent the meeting of the tracks (R 45°) of (A) with the tracks (Z) of (B), in which (F') represents the real intersection at 22.5°, but if we want to see the intersection also in the 90° track of (B) we introduce the example with the FIG. 9E only in order not to complicate the FIG. 9, in which the intersection completes by another 22.5° the perfect equilibrium of the circumference.

The four arrows (F') and the four triangles (tri) in FIG. 9E show the perfect balance of 16 points described as conceived in the semi-elliptical system also known as bent elliptical tracks.

By a practical point of view it should be noted that the translators must always be in couple to maintain the perfect balance of rotation and must be minimum 4 and increase progressively from 4 to 8 and so on.

FIG. 9E also highlights how each pair of spheres generates connecting axes that meet at the center with the axis of the other spheres whose projection is always 90° in the center. (See triangles and arrows of FIG. 9E better highlighted).

FIG. 9E can be better interpreted if we consider that: both the arrows (F') and triangles (tri) represent eight crossings, or eight translators.

While FIG. 9c with the four square symbols and four round symbols represents eight other crossings, or eight other translators.

Observing and superimposing the two figures we see that the symbols of FIG. 9c occupy the points each 45° intervals on a circumference, while the symbols of FIG. 9E occupy the midpoints of 22.5° between the 45° intervals of FIG. 9c of sixteen translators, which will be perfectly coupled in an entire circumference to the 16 spheres of (B). And it must be imagined that every instant of the rotation ZERO=Z disengages four spheres of (A) and four spheres of (B), it follows that in this coupling we would always have 32−8=24 spheres active for rotation, that is we would have 12 spheres for each tree.

With the same reasoning we can affirm that with a differential of four translators we would always have in traction a minimum of two spheres per shaft.

This reasoning holds true only when we analyze the two-lane differential for each shaft, but if we face the analysis of miniaturization where the theory of long shafts with four translators of active spheres for traction will be as many as there are the repetitions.

In the example of the shaft with four tracks (Z) and four tracks (R) per shaft we will always have 8 spheres per shaft active for rotation in the instant ZERO, and 16 in the rest of shaft traction.

The differential object will be limited only by the dimensions that the designer use to represent the invention in the most useful way for his project.

In figure of 8/8 the object of the present disclosure 1 is presented of which from FIG. 32 to FIG. 36 a form of differential can be distinguished in its essence, i.e. shafts (A) and (B) of FIG. 32 are separated by the opposite spheres in the center and at the ends where they meet the caps or ring nuts (EC) of the cylinder (CI). FIG. 33 highlights the assembly of the four translators (T) with the spheres (S) in the shafts (A) and (B), FIG. 34 shows the assembly of the cylinder in cut form with spheres and ring nut (EC) screwed into the outer circumference of the cylinder (CI) inside which you can see the shafts and translators. FIG. 34 represents the main figure in its form of applicability in the automotive industry. FIG. 35 presents the 4 translators in part separated from the assembly, FIG. 36 shows the cylinder (CI) in which the internal sliding tracks of both translators (T) and spheres (S) can be seen, FIG. 37 has two long shafts (A) and (B) of the type with multiple tracks, this figure represents an example with four tracks (Z) and four tracks (R) for each shaft (A) and (B), used for the realization of a form of the differential called differential long or miniature dedicated in particular as a differentiated shaft for electric motors, also useful for being installed in the gearbox of a traditional engine and also useful as a differential to be installed on the deck of trucks of any capacity.

The invention claimed is:

1. A differential comprising:
a casing containing a cylinder rotatable on bearings positioned between the casing and the cylinder;
two shafts positioned within the cylinder axially adjacent and concentric to one another and configured to receive a drive torque applied from the cylinder, the two shafts including grooves positioned on external surfaces of the two shafts;
translation tracks longitudinally positioned on an inner wall of the cylinder;
translators positioned in the translation tracks between the cylinder and the two shafts, the translators including through holes and balls positioned in the through holes tangent to the inner wall of the cylinder, with the balls at least partially engaging respective ones of the grooves of the two shafts, thereby providing a torque transmitting connection between the cylinder and the two shafts;
wherein the grooves are concave and curve around the two shafts;
a first shaft of the two shafts having first and second grooves of the grooves, the first groove having a curve of a first configuration and the second groove having a curve of a second configuration, the second groove being positioned adjacent the first groove, a second shaft of the two shafts having third and fourth grooves, the third groove having a curve of the first configuration and the fourth groove having a curve of the second configuration, the fourth groove being positioned adjacent the third groove;
wherein the first and third grooves having the curves of the first configuration run parallel to one another, and the fourth groove having the curve of the second configuration mirrors the second groove having the curve of the second configuration, wherein peaks and valleys of the second and fourth grooves are angularly offset by 45° from peaks and valleys of the first and third grooves, respectively.

2. The differential according to claim 1, and further comprising a cross shaped element positioned in a center of the cylinder between the two shafts, the cross shaped element having four arms rigidly positioned in four respective slots of the cylinder.

3. The differential according to claim 1, wherein the first shaft has a first end wall opposing the second shaft and a first elliptical track positioned in the first end wall; wherein the second shaft has a second end wall opposing the first shaft and a second elliptical track positioned in the second end wall; wherein the first and second elliptical tracks are concave; wherein the first elliptical track is positioned such that a minor axis of an ellipse of the first elliptical track is positioned on a projected line on a minor axis of the first configuration curves of the first and second shafts, the minor axes corresponding to an inversion line of the first configuration curves of the first and second shafts; wherein the minor axis of the ellipse of the first elliptical track is rotated by 90° with respect to a minor axis of an ellipse of the second elliptical track.

4. The differential according to claim 1, wherein the translation tracks are positioned internally of a thickness of the cylinder.

5. The differential according to claim 1, and further comprising:

a solenoid shaft positioned internally of at least one of the two shafts in a hexagonal bore of the at least one of the two shafts and a bilateral spring acting on the solenoid shaft;

a magnetic iron anchor positioned on an opposite side of the solenoid shaft from the spring;

a seat of the solenoid shaft positioned in a hexagonal pocket in an end wall of the at least one of the two shafts.

6. The differential according to claim 1, wherein each translation track has a respective translator positioned therein, wherein there are four translation tracks sequentially centered at 90° apart around the inner wall of the cylinder and at a same depth in the cylinder, each translator having the through holes spaced at a same pitch as the grooves on the shafts, the through holes including hemispherical seats for receiving the balls.

7. The differential according to claim 1, wherein each of the first and second shafts includes a series of pairs of the first and second configuration curves depending on a length of the first and second shafts.

8. The differential according to claim 1, wherein the holes of the translators have a circumferential bearing surface and are open on at least one end.

9. The differential according to claim 1, and further comprising a solenoid coil positioned outside the cylinder and on one side of the casing inside the casing.

10. The differential according to claim 1, wherein the first shaft includes a first end wall opposing the second shaft and a first circular track positioned in the first end wall; wherein the second shaft includes a second end wall opposing the first shaft and a second circular track positioned in the second end wall; wherein the first and second circular tracks are concave.

11. The differential according to claim 1, and further comprising at least one ring nut engaging threads on the cylinder to retain the translators and two shafts in the cylinder.

* * * * *